US010747699B2

(12) United States Patent
Otani et al.

(10) Patent No.: US 10,747,699 B2
(45) Date of Patent: Aug. 18, 2020

(54) BUS CONTROL CIRCUIT, SEMICONDUCTOR INTEGRATED CIRCUIT, CIRCUIT BOARD, INFORMATION PROCESSING DEVICE AND BUS CONTROL METHOD

(71) Applicant: SOCIONEXT INC., Yokohama-shi, Kanagawa (JP)

(72) Inventors: Takayuki Otani, Yokohama (JP); Teruhiko Kamigata, Yokohama (JP); Takashi Kawasaki, Yokohama (JP); Eiichi Nimoda, Yokohama (JP)

(73) Assignee: SOCIONEXT INC, Yokohama (JP)

( * ) Notice: Subject to any disclaimer, the term of this patent is extended or adjusted under 35 U.S.C. 154(b) by 0 days.

(21) Appl. No.: 16/273,943

(22) Filed: Feb. 12, 2019

(65) Prior Publication Data

US 2019/0188173 A1 Jun. 20, 2019

Related U.S. Application Data

(63) Continuation of application No. PCT/JP2017/017601, filed on May 9, 2017.

(51) Int. Cl.
*G06F 13/38* (2006.01)
*G06F 12/00* (2006.01)
(Continued)

(52) U.S. Cl.
CPC ............ *G06F 13/387* (2013.01); *G06F 12/00* (2013.01); *G06F 13/1663* (2013.01); *G06F 13/36* (2013.01); *G06F 2213/3852* (2013.01)

(58) Field of Classification Search
CPC . G06F 13/387; G06F 13/36; G06F 2213/3852
See application file for complete search history.

(56) References Cited

U.S. PATENT DOCUMENTS 5,263,146 A 11/1993 Mishima
5,522,058 A 5/1996 Iwasa et al.
(Continued)

FOREIGN PATENT DOCUMENTS

JP H06-110844 A 4/1994
JP H08-161228 A 6/1996
(Continued)

OTHER PUBLICATIONS

International Search Report issued in corresponding PCT Application No. PCT/JP2017/017601 dated Aug. 15, 2017.
(Continued)

*Primary Examiner* — Glenn A. Auve
(74) *Attorney, Agent, or Firm* — Arent Fox LLP

(57) ABSTRACT

A bus control circuit configured to transfer access commands for performing exclusive access between a first bus specification and a second bus specification by converting from a first exclusive access command applying to the first bus specification which deals with exclusive access, into a second exclusive access command of the second bus specification which doesn't deal with the exclusive access. The circuit includes an exclusive access command conversion circuit for receiving the first exclusive access command, converting the first exclusive access command into the second exclusive access command, and outputting the second exclusive access command; an exclusive access command generation circuit for receiving the second exclusive access command and generate the first exclusive access command; an exclusive access response issuing circuit for issuing exclusive access response information for the second exclusive access command; and an exclusive access response receiving circuit for receiving exclusive access response information for the second exclusive access command.

15 Claims, 23 Drawing Sheets

(51) Int. Cl.
G06F 13/36 (2006.01)
G06F 13/16 (2006.01)

(56) References Cited

U.S. PATENT DOCUMENTS

| | | |
|---|---|---|
| 2009/0300245 A1 | 12/2009 | Shoemaker et al. |
| 2012/0096199 A1 | 4/2012 | Lee et al. |
| 2013/0151750 A1* | 6/2013 | Kanigicherla ...... G06F 13/4022 710/313 |
| 2013/0156050 A1 | 6/2013 | Hiraoka et al. |
| 2015/0149680 A1 | 5/2015 | Kanda |
| 2016/0124891 A1 | 5/2016 | Ahmad et al. |
| 2018/0067877 A1* | 3/2018 | Balkan ................ G06F 13/1642 |

FOREIGN PATENT DOCUMENTS

| | | |
|---|---|---|
| JP | 2009-289264 A | 12/2009 |
| JP | 2015-127935 A | 7/2015 |
| JP | 2016-051420 A | 4/2016 |
| WO | WO 2013/094010 A1 | 6/2013 |

OTHER PUBLICATIONS

Written Opinion of the International Searching Authority issued in corresponding PCT Application No. PCT/JP2017/017601 dated Aug. 15, 2017.
European Search Report issued by the European Patent Office in corresponding Patent Application No. EP 17845778.4, dated Jan. 24, 2020.

* cited by examiner

FIG. 4
(a)
| Operation | Channel | Identifier |
|---|---|---|
| Read | Read address channel | AR |
|  | Read data channel | R |
| Write | Write address channel | AW |
|  | Write data channel | W |
|  | Write response channel | B |
(b)
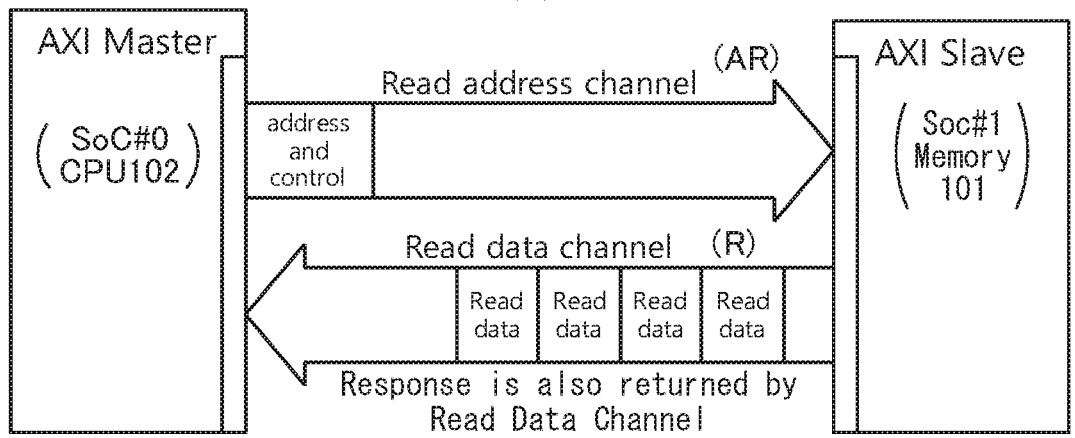
(c)
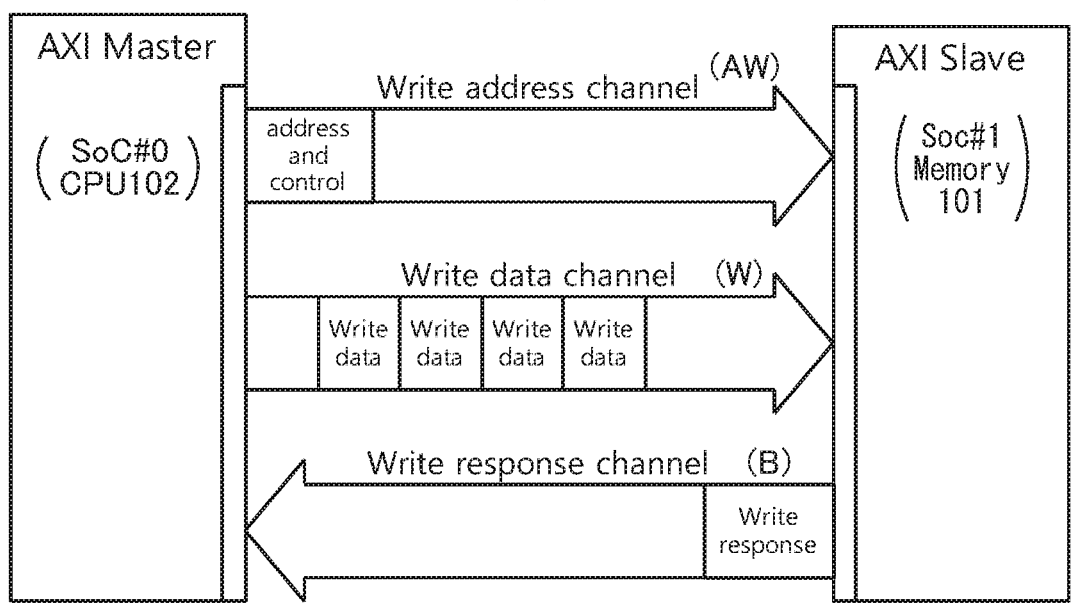

FIG. 6

| Channel | Signal Name | Output Source | Explanation |
|---|---|---|---|
| Read Address Channel | ARID[x:0] | Master | Read Address ID |
|  | ARADDR[x:0] | Master | Read Address |
|  | ARLOCK[1:0] | Master | Atomic Access: Designating Usually/Exclusive/Lock Access(AXI3 only). |
|  | ARUSER[x:0] | Master | User Signal: Which may be user-defined. |
|  | Other |  |  |
| Read Data Channel | RID[x:0] | Slave | Read Data ID |
|  | RDATA[x:0] | Slave | Read Data |
|  | RRESP[1:0] | Slave | Read Response: Indicating Result Status of Read Transfer. |
|  | Other |  |  |
| Write Address Channel | AWID[x:0] | Master | Write Address ID |
|  | AWADDR[x:0] | Master | Write Address |
|  | AWLOCK[1:0] | Master | Atomic Access: Designating Usually/Exclusive/Lock Access(AXI3 only). |
|  | AWUSER[x:0] | Master | User Signal: Which may be user-defined. |
|  | Other |  |  |
| Write Data Channel | WID[x:0] | Master | Write Data ID(AXI3 Only: Removed By AXI4) |
|  | WDATA[x:0] | Master | Write Data |
|  | Other |  |  |
| Write Response channel | BID[x:0] | Slave | Write Response ID(AXI3 Only: Removed By AXI4) |
|  | BRESP[1:0] | Slave | Write Response: Indicating Result Status of Write Transfer. |
|  | Other |  |  |

FIG. 8

| RRESP[1:0] BRESP[1:0] | Response | Explanation |
|---|---|---|
| 00 | OKAY | Normal Access Success or Exclusive Access Failure. |
| 01 | EXOKAY | One of Exclusive Read or Exclusive Write Success. |
| 10 | SLVERR | Slave Error: Error Notification from Slave to Master. |
| 11 | DECERR | Decoding Error: Indication where Slave is not present in Access Destination Address: Interconnect is usually generated. |

FIG. 9
(a)
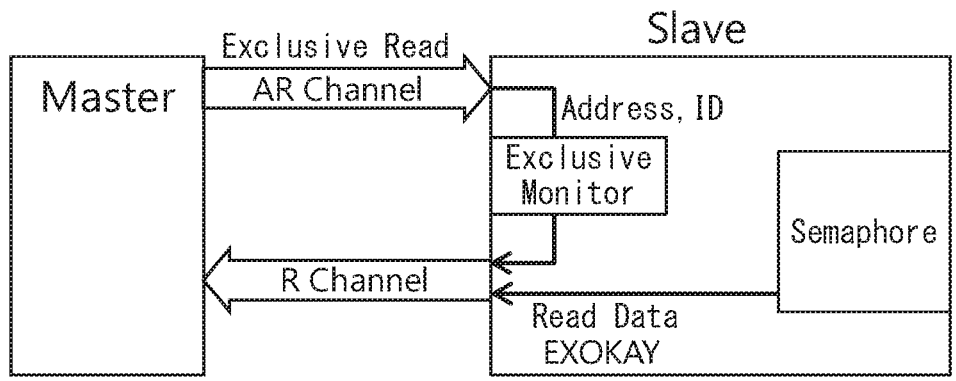
(b)
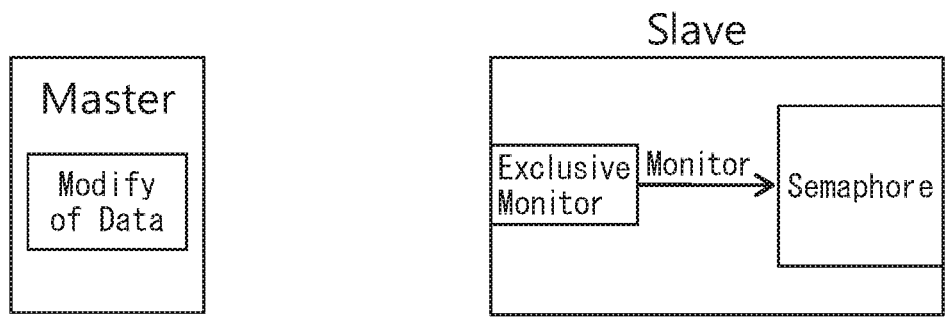
(c)
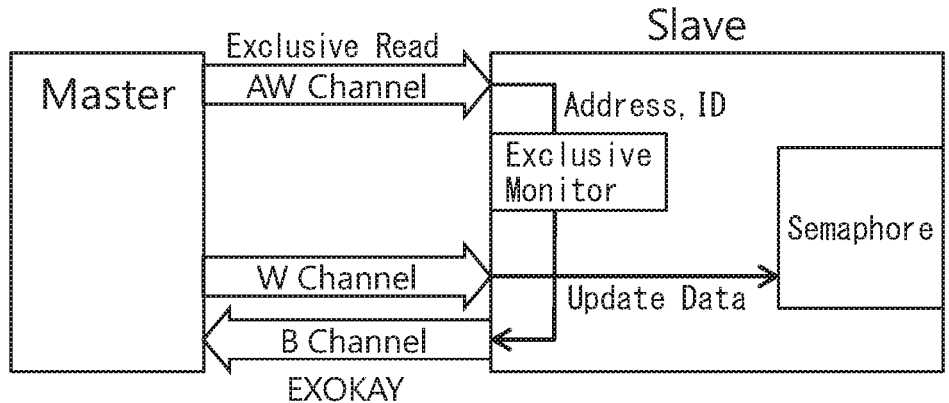

BUS CONTROL CIRCUIT, SEMICONDUCTOR INTEGRATED CIRCUIT, CIRCUIT BOARD, INFORMATION PROCESSING DEVICE AND BUS CONTROL METHOD

CROSS-REFERENCE TO RELATED APPLICATIONS

This application is a continuation application and is based upon PCT/JP2017/017601, filed on May 9, 2017, which claims the benefit of priority of the prior Japanese Patent Application No. 2016-169971, filed on Aug. 31, 2016, the entire contents of which are incorporated herein by reference.

FIELD

The present invention relates to a bus control circuit, a semiconductor integrated circuit, a circuit board, an information processing device and a bus control method.

BACKGROUND

Historically, information processing systems, such as servers include a plurality of semiconductor integrated circuits or circuit boards applying to different bus specifications. However, in such information processing systems, applying to different bus specifications there are sometimes difficulties reloading information from a first bus specification to information to a second bus specification that is different from the first bus specification.

A System on Chip (SoC) specification including an Advanced eXtensible Interface (AXI®), may implement an exclusive access or exclusive control of access to memory of the SoC in order to coordinate the secure communication of data between a processor and other modules within the chip allowing for the efficient use of a common resource in an Operating System (OS)®.

When executing an OS using an SoC including a plurality of Central Processing Units (CPUs) or assigning different OSs to a common CPU resource, it may be necessary to implement an exclusive control beyond a semiconductor integrated circuit (also hereinafter referred to interchangeably herein as a "chip"). However, even when an exclusive access control beyond such a chip is necessary, a transfer function of the exclusive access control may not be provided between chips applying to different bus specifications.

AXI®, which may be included in an advanced Microcontroller Bus Architecture (AMBA®, made by Arm Holdings Ltd located in Cambridge, England) is a general term for an on-chip interconnect specification, which may be used together with an Advanced High-performance Bus (AHB® made by Arm Holding Ltd located in Cambridge, England), for example. Further, for example, an Open Core Protocol (OCP®), a Processor InterFace (PIF®), etc., may provide other known specifications for such applications other than AMBA®.

As described above, among chips having different bus specifications, an exclusive control function may not have been previously provided. For example, a transfer function of an exclusive control may not have been previously provided between a semiconductor integrated circuit including a Peripheral Component Interconnect Express (PCIe®)

Such lack of a transfer function for exclusive control may exist between semiconductor integrated circuits, circuit boards or the like, including for different bus specifications, similarly to as may occur among semiconductor integrated circuits, circuit boards or the like to which various other bus specifications may be applied.

Aspects of the present invention are not limited to situations such as an exclusive control transfer between a PCIe® specification and an AXI® specification, but also may apply, for example, to an exclusive control transfer among semiconductor integrated circuits, circuit boards or the like, including for differing bus specifications. Specifically, aspects of the present Invention may potentially be applied to an exclusive control transfer among a semiconductor integrated circuit or the like, including a PCIe®, and a semiconductor integrated circuit or the like, including an AMBA®, such as an AXI®, an AHB®, and an APB®, or a semiconductor integrated circuit or the like, including an OCP® or a PIF®.

Incidentally, in the prior art, for example, various techniques have been proposed for an exclusive control in a multiprocessor system. See for example: Patent Document 1: Japanese Laid-open Patent Publication No. H06(1994)-110844; and Patent Document 2: Japanese Laid-open Patent Publication No. H08(1996)161228.

Patent Document 1: Japanese Laid-open Patent Publication No. H06(1994)-110844

Patent Document 2: Japanese Laid-open Patent Publication No. H08(1996)-161228

SUMMARY

According to an aspect of the present disclosure, control circuit is configured to transfer an exclusive access command between a first bus specification and a second bus specification by converting between a first exclusive access command, including a first format that deals with an exclusive access, and applying it to the first bus specification, and a second access command, including a second format that does not deal with exclusive access and is different from the first bus specification (such second access command also interchangeably referred to herein as a "second non-exclusive access command"), and applying to the second bus specification. According to various aspects, an embodiment of the present disclosure includes an exclusive command conversion circuit, an exclusive command generation circuit, an exclusive response issuing circuit, and an exclusive response receiving circuit.

When converting from the first exclusive command to the second non-exclusive command the exclusive command conversion circuit may be configured to receive the first exclusive access command as input, convert the first exclusive a command into the second non-exclusive command, and output the second non-exclusive access command. Conversely when converting from the second non-exclusive access command to the first exclusive access command, the exclusive command generation circuit may be configured to receive the second non-exclusive access command and generate the first exclusive access command.

The exclusive response issuing circuit may be configured to issue exclusive response information for the second non-exclusive access command when converting from the second non-exclusive access command to the first exclusive command. The exclusive response receiving circuit may be configured to receive the exclusive response information for the second non-exclusive access command, when converting from the first exclusive access command to the second non-exclusive command.

Various advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram for explaining a basic configuration of an AXI® (Part 1);

FIG. 6 is a diagram for explaining an example of signals in the AXI®;

FIG. 8 is a diagram for explaining a response used in the AXI®;

FIG. 9 is a diagram for explaining an operation of an exclusive access in the AXI;

DESCRIPTION OF EMBODIMENTS

Figure 1:
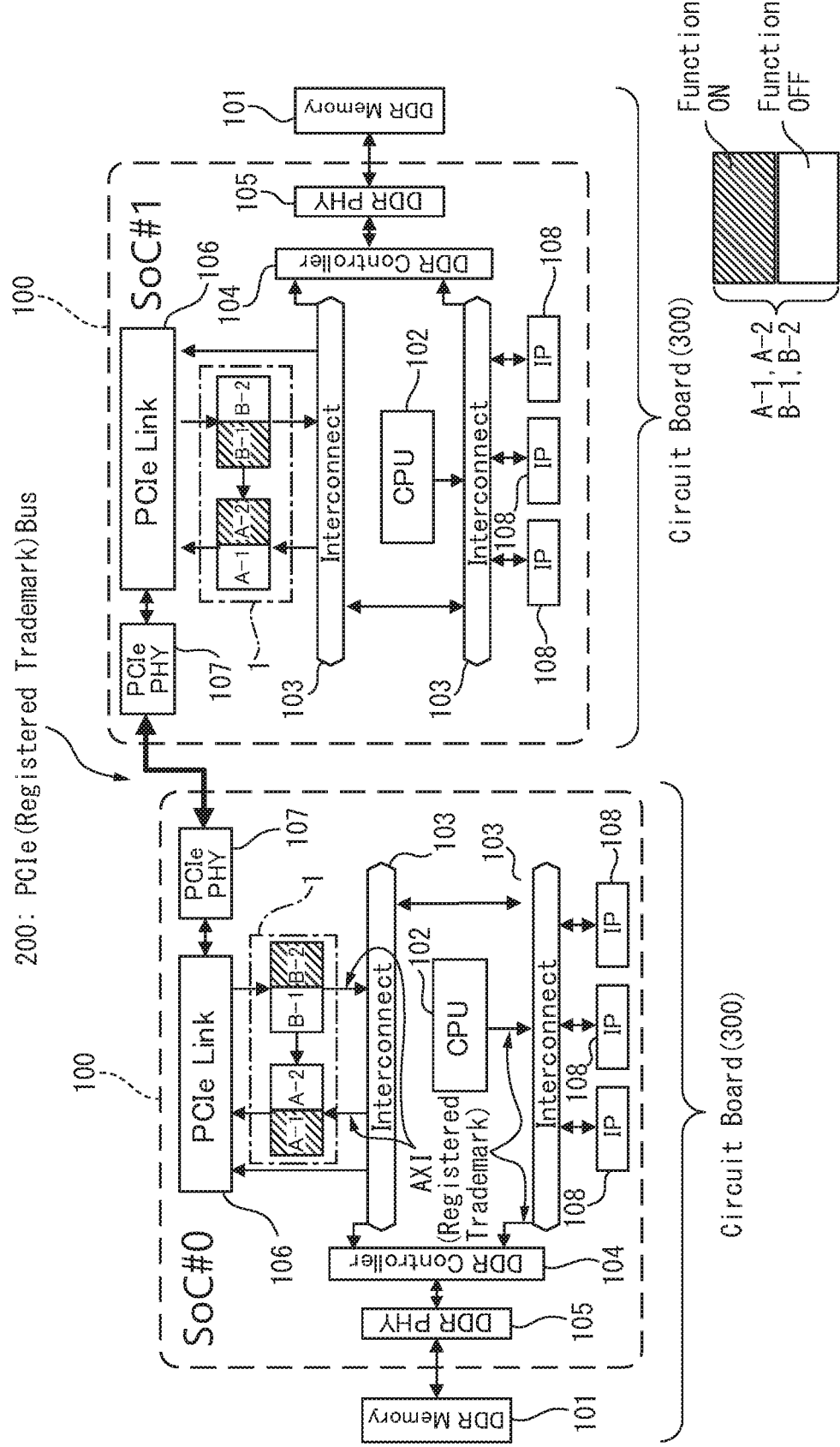
FIG. 1 is a block diagram depicting an example of an information processing device according to the present embodiment.

Hereinafter, embodiments of a bus control circuit, a semiconductor integrated circuit, a circuit board, an information processing device and a bus control method will be described in detail with reference to the accompanying drawings. FIG. 1 is a block diagram depicting an example of an information processing device according to the present embodiment. In FIG. 1, reference numeral 100 denotes an SoC (semiconductor integrated circuit), and 200 denotes a PCIe® bus.

In FIG. 1, two SoCs (SoC #0, SoC #1) 100 are connected by a PCIe® bus (PCIe®) 200 as an example, however, the number of SoCs 100 is not limited to two, and a specification of the SoC 100 is not limited to the AXI®. Further, the bus connecting the plurality of SoCs 100 is not limited to the PCIe® 200.

Note that, the SoC 100 is formed as a single semiconductor integrated circuit (chip), but the SoC 100 may also be formed as a plurality of chips. Furthermore, in FIG. 1, a circuit board 300 is formed by the SoC 100 (controller) and a memory 101, and an information processing device (for example, a server) is formed by a plurality of circuit boards 300, but the present embodiment may be widely applied to various configurations.

As depicted in FIG. 1, each circuit board 300 includes an SoC 100 and a memory (for example, DDR (Double-Data-Rate) Memory) 101. The circuit board 300 may include various chips (semiconductor integrated circuits). The SoC 100 includes a bus control circuit (exclusive access circuit) 1, a CPU 102, an internal connection circuit (Interconnect) 103, memory connection circuits (104, 105), external connection circuits (106, 107), and various IPs ((IP: Intellectual Property) cores, IP macros) 108.

The memory connection circuit includes, for example, a memory control circuit (DDR Controller) 104 for controlling a connection with a memory (DDR Memory) 101, and an interface IP macro (DDR PHY) 105 of the memory 101. The external connection circuit includes, for example, a link control circuit (PCIe® Link) 106 for controlling a connection (link) with the other SoC 100 (circuit board 300) through a PCIe® 200, and an interface IP macro (physical layer of PCIe®: PCIe® PHY) 107.

The Internal connection circuit 103 exchanges signals (data and commands) between the CPU 102, and the memory control circuit (DDR Controller) 104, the bus control circuit 1 and the IP macros 108 based on the AXI® specification. Further, the CPU 102, the memory control circuit 104, the IP macros 108 and the like may constitute an internal circuit of the AXI® specification (internal bus specification). Here, the bus control circuit 1 receives and converts signals of the AXI® specification, and outputs to the PCIe® (external bus) 200 through the external connection circuit (link control circuit 106 and the physical layer 107). Further, the bus control circuit 1 converts signals Input from the PCIe® 200 through the external connection circuits (106, 107), and outputs to the internal connection circuit 103 (CPU 102, the memory control circuit 104 and the IP macros 108, etc.) of the AXI® specification.

The bus control circuit 1 includes an exclusive command conversion block A-1, an exclusive response issuing block A-2, an exclusive command generation block B-1 and an exclusive response receiving block B-2, and is provided on each of the SoCs 100.

Here, when the exclusive command is output from one SoC #0 through the PCIe 200 to the other SoC #1 (when an exclusive access is issued from the SoC #0 to the SoC #1), blocks A-1, A-2, B-1 and B-2 in each of the SoCs 100 operate as follows. In one SoC #0, the blocks A-1 and B-2 are turned ON (activated), and the blocks A-2 and B-1 are turned OFF (inactivated); and in the other SoC #1, the blocks A-1 and B-2-are turned OFF, and the blocks A-2 and B-1 are turned ON.

Note that the exclusive access indicates an access, for example, in the case of sharing resources (memory, etc.) and wherein, while a specific portion (specific address of the memory, etc.) of the shared resources is accessed by the SoC #0, the specific portion the shared resources may not be accessed by the SoC #0 so as to maintain an integrity of the shared resources. Further, the exclusive command indicates a command for requesting the exclusive access, for example, including an exclusive read command and an exclusive write command.

On the other hand, a normal access indicates an access, for example, not including the above exclusive control. Further, a normal command indicates a command for requesting the normal access, for example, including a normal read command and a normal write command.

Figure 2:
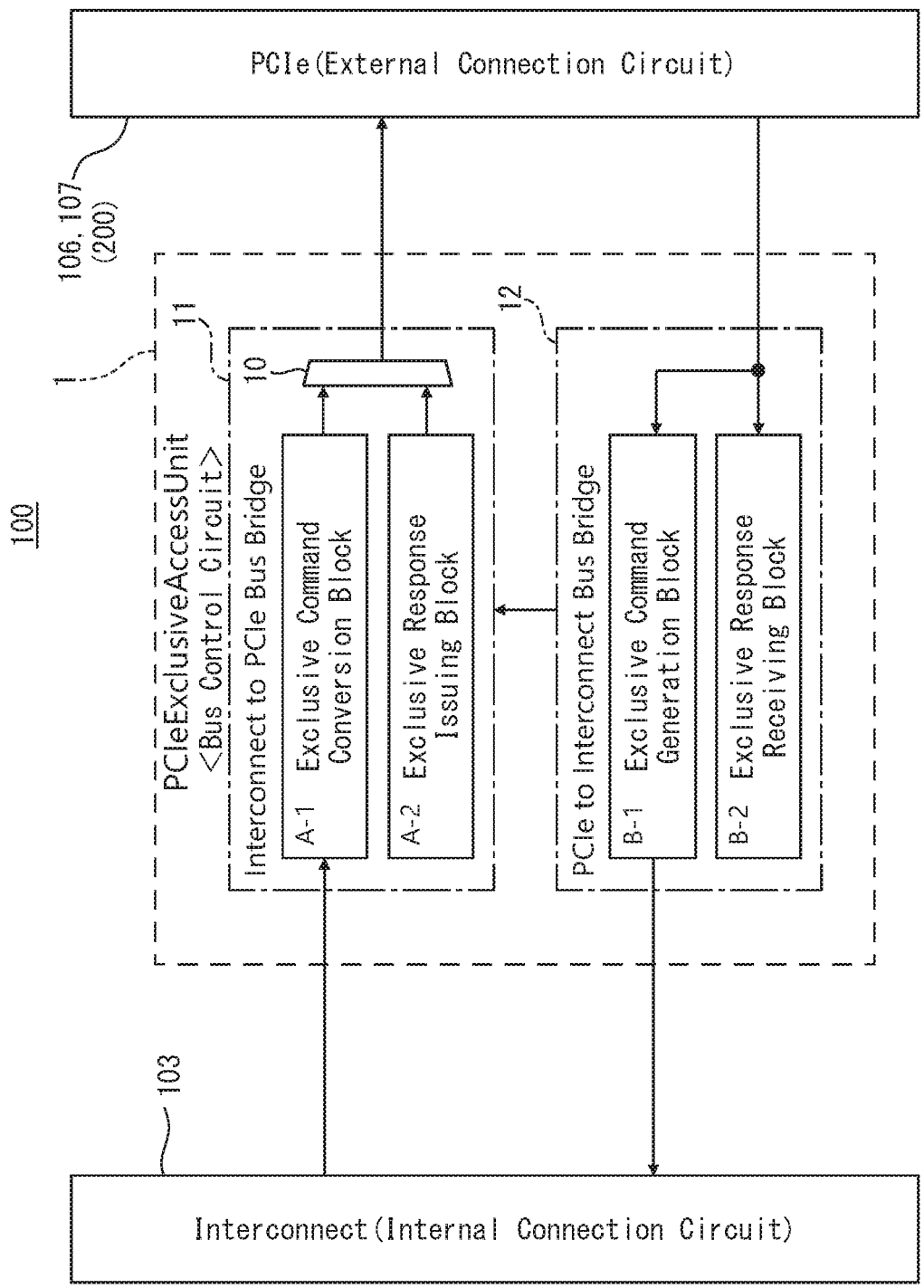
FIG. 2 is a block diagram depicting an example of a bus control circuit in a semiconductor integrated circuit in the information processing device depicted in FIG. 1.

FIG. 2 is a block diagram depicting an example of a bus control circuit in a semiconductor integrated circuit in the information processing device depicted in FIG. 1. As depicted in FIG. 2, in document, each semiconductor integrated circuit (SoC #0, SoC #1) 100, a bus control circuit (PCIe® Exclusive Access Unit) 1 includes a first converter (Interconnect to PCIe® Bus Bridge) 11 for converting signals from an internal connection circuit 103 to external connection circuits 106, 107 connected to a PCIe® 200. Further, the bus control circuit 1 includes a second converter (PCIe® to Interconnect Bus Bridge) 12 for converting signals from the external connection circuits 106, 107 connected to the PCIe® 200, to the internal connection circuit 103.

The first converter 11 receives and converts an exclusive command from the internal connection circuit 103, and outputs the converted command to the external connection circuits 106, 107 connected to the PCIe® 200; and the first converter 11 includes a command conversion block A-1, an exclusive response Issuing block A-2, and a selector 10.

Here, the command conversion block A-1 is a circuit, for example, which receives an exclusive command applying to an AXI® specification and including a format suitable for an exclusive control within the semiconductor integrated circuit 100 from the internal connection circuit 103, converts Into an exclusive command applying to an AXI® specification and including another format suitable for the PCIe® specification, and outputs to the external connection circuits 106, 107.

Further, the exclusive response issuing blocks A-2 is a circuit, for example, which receives exclusive response information included in the exclusive command applying to the AXI® specification of the internal connection circuit 103 from an exclusive command generation block B-1, and issues the exclusive response information suitable for the PCIe® specification to the external connection circuits 106, 107. Note that the selector 10 is a circuit for selecting an output of the command conversion block A-1 or the exclusive response issuing blocks A-2, and outputting to the PCIe® 200.

The second converter 12 receives and converts the exclusive command from PCIe® 200, and outputs the converted command to the internal connection circuit 103, and the second converter 12 includes the exclusive command generation block B-1 and the exclusive response receiving block B-2. Here, the exclusive command generation block B-1 is a circuit, for example, which receives an exclusive command applying to an AXI® specification and including a format suitable for the PCIe® specification from the external connection circuits 106, 107 connected to the PCIe® 200, generates an exclusive command applying to an AXI® specification and Including another format suitable for an exclusive control within the semiconductor integrated circuit 100, and outputs the generated command to the Internal connection circuit 103. Further, the exclusive response receiving block B-2 is a circuit, for example, which receives exclusive response information for the exclusive command issued from the external connection circuits 106, 107 to the PCIe® 200, and output the received command to the block A-1. Next, an example using a PCIe® and an AXI® as different two bus specifications for converting an exclusive access in the present embodiment will be explained with reference to FIG. 3 to FIG. 9, and thereafter, the present embodiment will be explained in detail with reference to FIG. 10 to FIG. 23.

Figure 3:
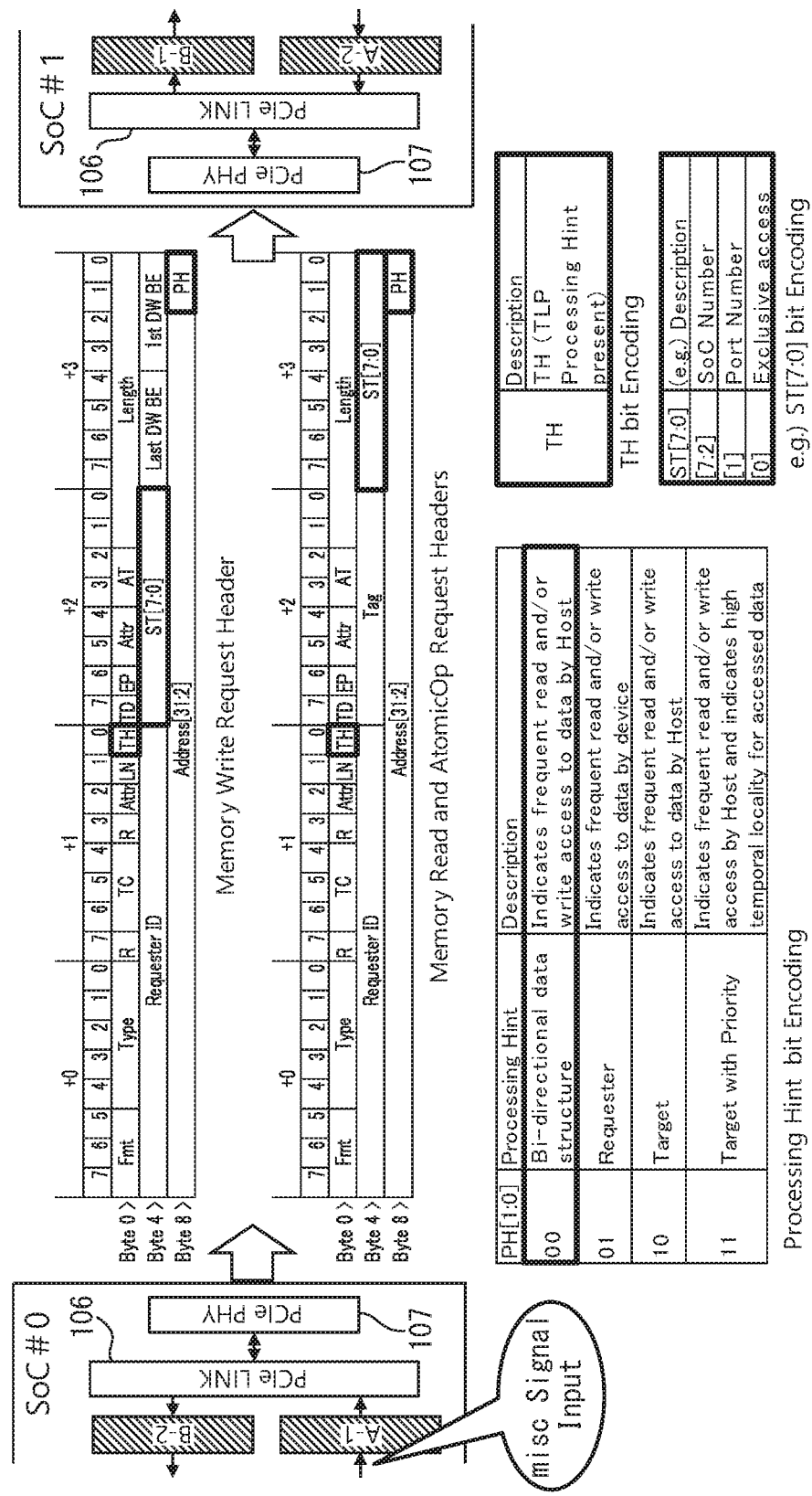
FIG. 3 is a diagram for explaining an example of transmitting an exclusive access command using a TLP header of a PCIe® packet in the information processing device depicted in FIG. 1.

FIG. 3 is a diagram for explaining an example of transmitting an exclusive command using a TLP header of a PCIe® packet in the information processing device depicted in FIG. 1, document, and for explaining the case of inputting miscellaneous (hereinafter interchangeable referred to as "Misc") signals of the AXI®. Here, the Misc signals are, for example, a user signal which may be defined by a user in the AXI®, and used for propagating miscellaneous information. Note that FIG. 3 indicates a memory write request header in a TLP (Transaction Layer Packet) header of a PCIe® packet, and a memory read and atomic operation request header.

As described with reference to FIG. 1, for example, when an exclusive access is Issued from one SoC #0 to the other SoC #1, in the SoC #0, the blocks A-1 and B-2 are turned ON, and in the SoC #1, the blocks A-2 and B-1 are turned ON. Here, the TLP header in the PCIe® includes a structure as depicted in FIG. 3, and performs a conversion of an exclusive access by using, for example, TLP Processing Hint present (TH) bits, which are open to the user, ST[7:0] fields and Processing Hint (PH) bits. Note that, in the present specification, for example, an example of using a TLP header as a bit field in the PCIe® Incorporating an exclusive command in the AXI® will be explained, however, this is merely an example, and various types of bit fields in the PCIe® specification may be used.

Specifically, in the SoC #0, TH bits of a TLP header in a PCIe®, ST[7:0] fields and PH bits are treated as Misc signals of the AXI® Input to the PCIe®. The external connection circuits 106, 107 of the SoC #0 generate TH bits of the TLP header, ST[7:0] fields, and PH bits in the PCIe® based on bit Information of the Misc signals of the AXI®. The Misc signals may include, for example, ARUSER[x:0] and AWUSER[x:0] of the AXI®, which will be described later. Further, in the SoC #1, Misc signals of the AXI® are treated as the TH bits of the TLP header in the PCIe®, the ST[7:0] fields and the PH bits input to the AXI®. PCIe®, Here, the external connection circuits 106, 107 of the SoC #0 generate Misc signals of the AXI® base on bit information of the TH bits of the TLP header in the PCIe®, the ST[7:0] fields and the PH bits. The Misc signals may Include, for example, ARUSER[x:0] and AWUSER[x:0] of the AXI®, which will be described later.

Note that bits treated as the Misc signals are not limited to TH bits of a TLP header in a PCIe®, ST[7:0] fields and PH bits, but the Misc signals may use other bits which are open to the user. Furthermore, it is of course that bits used for converting the exclusive access is not limited to those in the TLP header.

Figure 5:
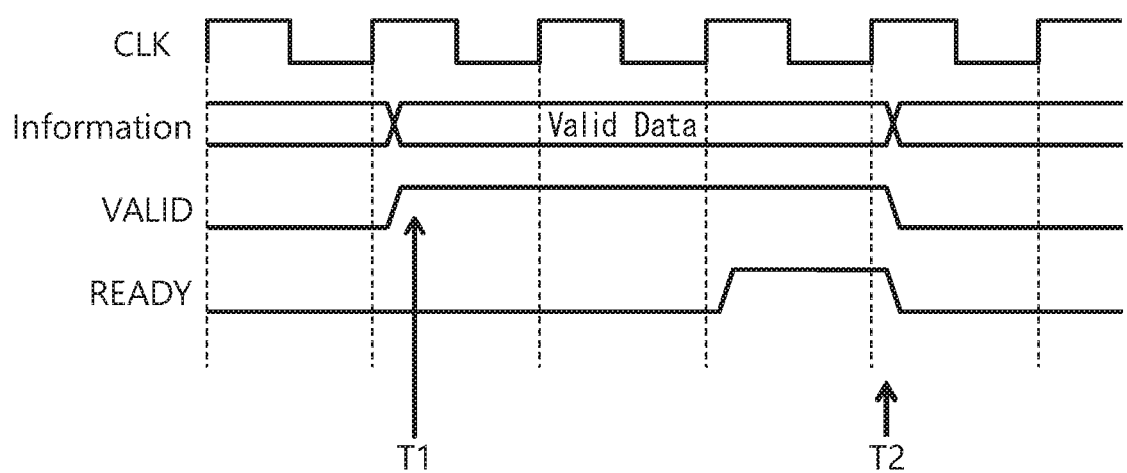
FIG. 5 is a diagram for explaining the basic configuration of the AXI® (Part 2)

FIG. 4 and FIG. 5 are diagrams for explaining the basic configuration of the AXI®. As depicted in FIG. 4(a), an AXI® includes a read address for reading (AR) channel "Read address channel" and a read data (R) channel "Read data channel". Further, the AXI® includes a write address for writing (AW) channel "Write address channel", a write data (W) channel "Write data channel" and a write response (B) channel "Write response channel". Therefore, the AXI® includes five channels.

FIG. 4(b) is a diagram for explaining a read operation in the AXI® and FIG. 4(c) Is a diagram for explaining a write operation in the AXI®. Note that, in FIG. 4(b) and FIG. 4(c), "AXI® Master" Is assumed to the CPU 102 of the SoC #0 depicted in FIG. 1, and "AXI® Slave" is assumed to the memory (DDR memory) 101 of the SoC #1 depicted in FIG. 1.

Further, between the "AXI® Master" and the "AXI® Slave", an Internal connection circuit 103 of the SoC #0, a bus control circuit 1 and external connection circuits 106, 107, PCIe® 200, external connection circuits 106, 107 of the SoC #1, and the like are provided.

As depicted in FIG. 4(b), when data from the "AXI® Master" to the "AXI® Slave" (memory 101 in the SoC #1) is read, "AR" and "R" depicted in FIG. 4(a) are used. Further, as depicted in FIG. 4(c), when data from the "AXI® Master" is written to the "AXI® Slave", "AW", "W" and "B" depicted in FIG. 4(a) are used.

As depicted in FIG. 5, each channel includes signals of valid (VALID)/ready (READY)/transmission information (Information) for an operation of a transaction, and information is exchanged by a handshake of VALID/READY. Here, a reference CLK denotes a clock.

First, a transmitting side asserts a VALID signal (T1 depicted in FIG. 5) indicating that information is valid, and a receiver side asserts a READY signal indicating that the receiving side may receive the valid information. For example, a handshaking may be established at a specific edge of the clock when the VALID and READY signals are both high level "H". Note that the transmitting side holds the Information and the VALID signal to a timing T2 depicted in FIG. 5. In this way, an exchange of information may be completed.

FIG. 6 is a diagram for explaining an example of signals in the AXI®. In this embodiment, for example, signals ARLOCK[1:0], ARUSER[x:0], RRESP[1:0], AWLOCK[1:0], AWUSER[x:0] and BRESP[1:0] which are surrounded by a thick frame in FIG. 6 may be used. Here, the ARLOCK [1:0] indicates an atomic access and is a signal (AXI3® (version 3 of the AXI®) only) designating usual/exclusive/lock accesses, and the ARUSER[x:0] is a user signal, which may be defined by a user, and is one of the above-mentioned Misc signals. Further, RRESP[1:0] indicates a read response, and is a signal indicating a result status of the read transfer. Note that a reference [x:0] indicates an arbitrary bit width.

Further, the AWLOCK[1:0] indicates an atomic access and is a signal (AXI3® only) designating usually/exclusive/lock accesses, and the AWUSER[x:0] is a user signal, which may be defined by a user, and is one of the above-mentioned Misc signals. Further, the BRESP[1:0] indicates a write response, and is a signal Indicating a result status of the write transfer.

Figure 7:
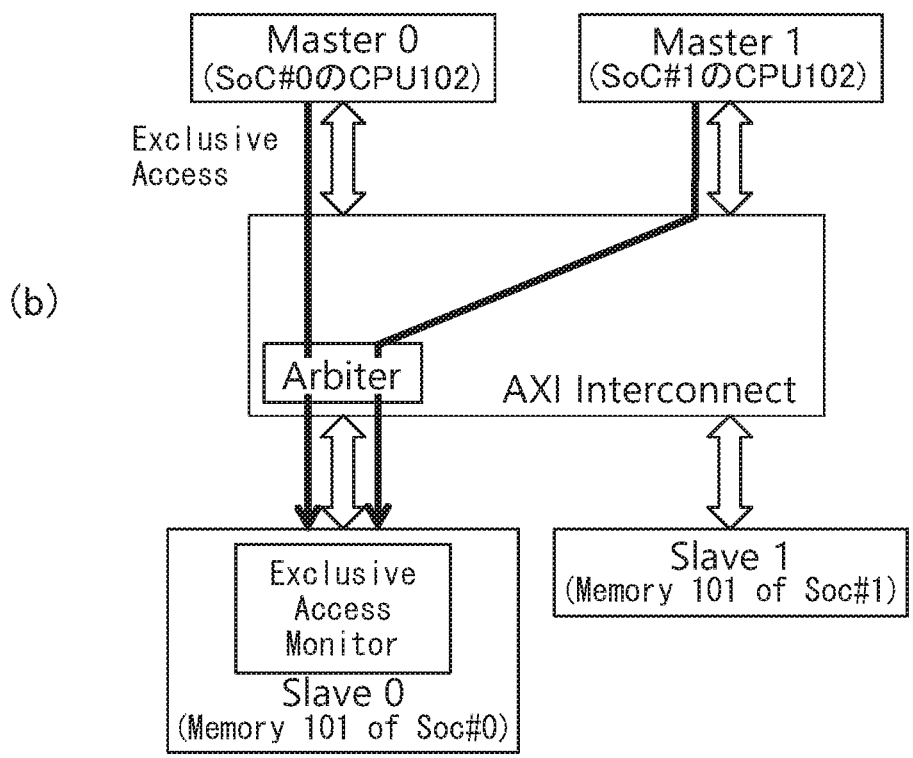
FIG. 7 is a diagram for explaining an example of an exclusive access in the AXI.

FIG. 7 is a diagram for explaining an example of an exclusive access in the AXI®. As depicted in FIG. 7(a), values "00", "01", "10" and "11" of a 2-bit signal AxLOCK [1:0] indicate "normal access", "exclusive access", "lock access" and "reserved", respectively. Note that the AxLOCK [1:0] indicates both ARLOCK[0 1] and ARLOCK[1 0]. Further, a value "10" of the AxLOCK[1:0] is removed in an AXI4® (version 4 of the AXI®).

FIG. 7(b) indicates a case where accesses of a master 0 (Master 0: for example, a CPU 102 of the SoC #0) and a slave 0 (Slave 0: for example, a memory 101 of the SoC #0) are competed. Note that the slave 1 (Slave 1) is, for example, the memory 101 of the SoC #1.

As depicted in FIG. 7(b), when accesses a specific address (of the memory 101 in the SoC #0) is competed by the master 0 and the slave 0, it is possible to realize a semaphore type processing, for example. Here, to realize an exclusive access, it may be required to provide an exclusive access monitor for the slave 0 (memory 101 of the SoC #0). Further, the exclusive access monitor for the Slave depicted in FIG. 7(b), may monitor an address for accessing an Slave 0, during an exclusive access command from a Master 0 to the Slave 0, it may be possible for a Master 1 to access another address of the Slave 0.

FIG. 8 is a diagram explaining a response used in the AXI®. As depicted in FIG. 8, for example, the AXI® may issue four types of responses: "OKAY", "EXOKAY", "SLVERR" and "DECERR", wherein each response corresponds with values "00", "01", "10" and "11", respectively, also represented by a 2-bit RRESP[1:0] and BRESP[1:0].

Here, the "OKAY" Indicates that a normal access has been successful or an exclusive access has failed. The "EXOKAY" indicates that either an exclusive read command or an exclusive write command is successful. The "SLVERR" Indicates a slave error, which is a notification from the slave to the master. Further, the "DECERR" indicates either a decoding error or an destination address error, wherein the destination address is not present in the slave, and is usually generated by an interconnect.

Specifically, in the case of a write command, a single response is returned for an entire burst. In case of a read command, a response may be returned for each data transfer in the burst. Here, it may be possible to return different responses for each different data transfer, and to perform the remaining transfer operations even if an error occurs during one of the transfer operations.

FIG. 9 is a diagram explaining an operation of an exclusive access in the AXI®. Here, the exclusive access command operates as a basic semaphore access (read-modify-write).

As depicted in FIG. 9(a), when the master performs an exclusive read command (ARLOCK[0:1]="01"), the exclusive monitor stores an address and an ID, and the slave returns read data to the master by the "EXOKAY". Note that the slave, which is not dealing with an exclusive access command, returns the "OKAY" to the master so as to notify the master that the slave is not compatible with the exclusive access command.

As depicted in FIG. 9(b), when the master performs a modifier command on the data, the exclusive monitor monitors whether or not a semaphore area is rewritten by another master. Note that the exclusive monitor continues a monitoring operation until causing a write operation from another master (ID) or an exclusive read operation to another address.

As depicted in FIG. 9(c), when the master performs an exclusive write command (AWLOCK[0:1]="01") to updated data while the exclusive monitor continuously monitors the same address, exclusivity is guaranteed, a write operation is performed, and the "EXOKAY" is returned. Further, if the exclusive monitor does not monitor the address the exclusivity is not guaranteed, the write operation is not performed, and the "OKAY" is returned.

Incidentally, since an exclusive control function is not provided for the PCIe®, for example, in a system connected to two SoC #0 and SoC #1 applying to the AXI®, it is difficult to perform an appropriate exclusive access control.

Figure 10:
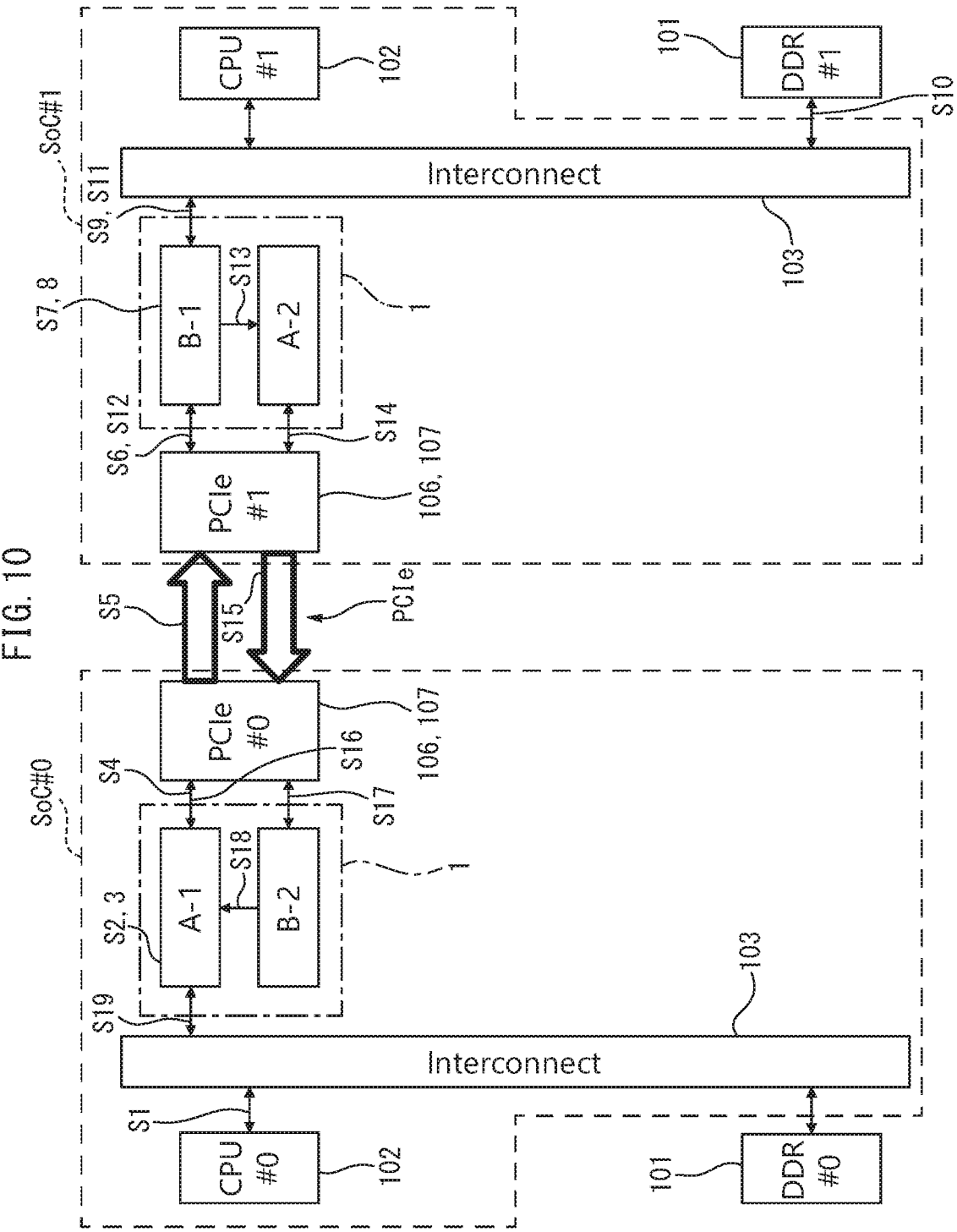
FIG. 10 is a diagram for explaining an example of a read access operation in the information processing device depicted in FIG. 1.
Figure 11:
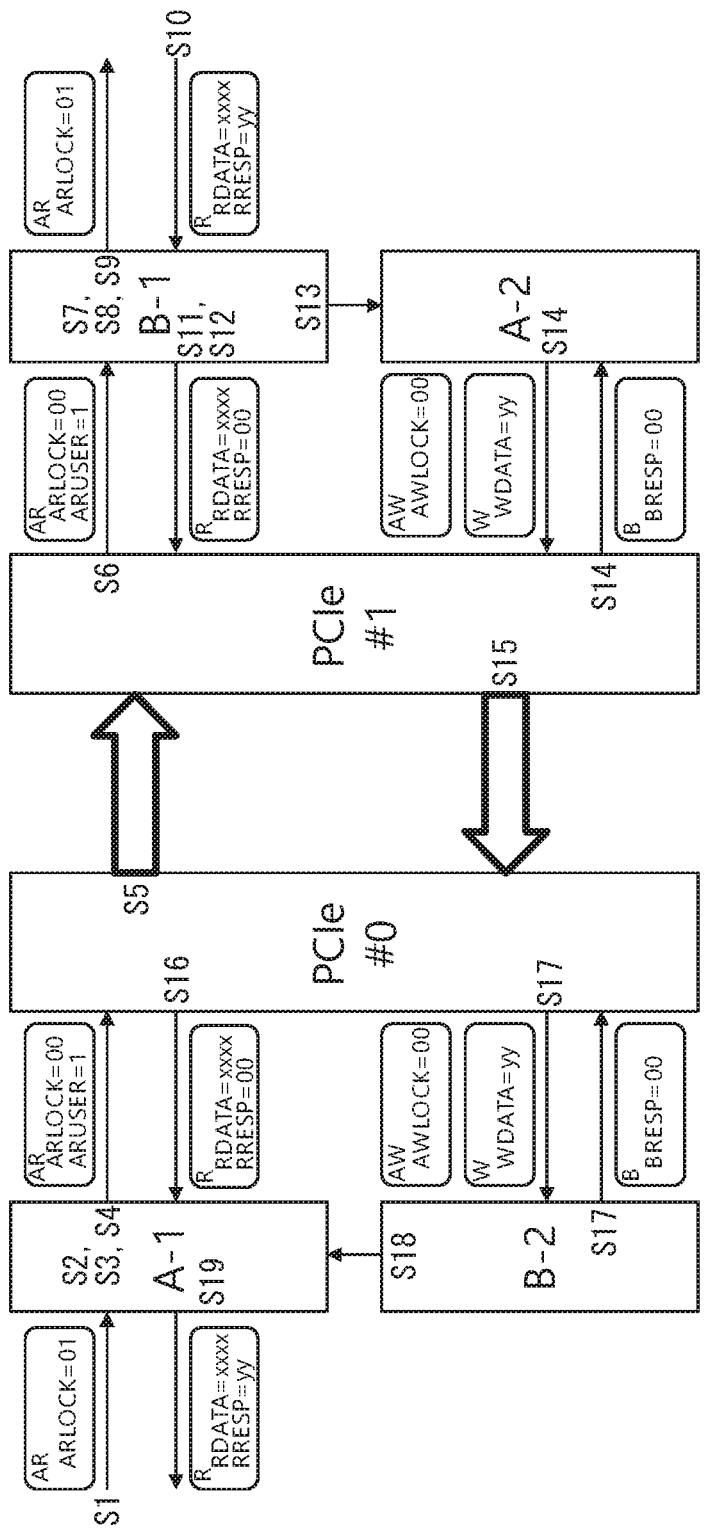
FIG. 11 is a diagram for explaining an example of an exclusive read access operation in the information processing device depicted in FIG. 10.

FIG. 10 is a diagram explaining an example read access operation in the information processing device depicted in FIG. 1. FIG. 11 is a diagram for explaining an document, example exclusive read access operation in the information processing device depicted in FIG. 10, and for explaining a conversion of AXI® commands in the exclusive read access operation.

In FIG. 10 and FIG. 11, a bus used to exchange commands and various information within the SoC #0 and SoC #1 may be an AXI®, which deals with an exclusive read access. The bus used to exchange commands and various information between the SoC #0 and SoC #1 may be a PCIe®, which does not deal with the exclusive read access. Note that, in FIG. 11, "xxxx" Indicates read data, "yy" indicates exclusive responses. Further, ARUSER[x:0](for example, exclusive access="1") are used as Misc signals.

As depicted in FIG. 10 and FIG. 11, first, an exclusive read access command (exclusive read) is issued from a CPU 102 (CPU #0) of the SoC #0 (step S1), and an exclusive read command is stored in an exclusive command conversion block A-1 (step S2: AR ARLOCK="01"). Next, the exclusive read information is set to Misc signals of the AXI® by the block A-1 (step S3: AR ARUSER="1"). Further, a normal read command (with Misc signals) is issued from the block A-1 (step S4: AR ARLOCK="00", ARUSER="1") to an external connection circuit (link control circuit 106 and the PCIe® PHY 107: PCIe®#0) in the SoC #0, for example.

Further, a read command including exclusive control information, wherein the exclusive control information may be in header information is issued from the PCIe®#0 (external connection circuit of the SoC #0) to the PCIe®#1 (external connection circuit of the SoC #1) (step S5), and a normal read command (with Misc signals) is issued from the PCIe®#1 to an exclusive command generation block B-1 (step S6: AR ARLOCK="00", ARUSER="1"). Further, the block B-1 holds the normal read command (with Misc signals) (step S7), and generates an exclusive read command from the exclusive read information of the Misc signals (step S8).

Next, an exclusive read command is issued from the block B-1 in a memory 101 of the SoC #1 (DDR #1) (step S9: AR ARLOCK="01"), the DDR #1 issues an exclusive read response (step S10), and the exclusive read response is held by the block B-1 (step S11: R RDATA="xxxx", RRESP="yy").

Further, read data (Read Data) Is output from the block B-1 to the PCIe®#1 as a response of the normal read command (step S12: R RDATA="xxxx", RRESP="00"), and identification information (exclusive read response Information) for indicating an exclusive read response is issued from the block B-1 to the exclusive response issuing blocks A-2 based on the exclusive read response held by the block B-1 (step S13: R RRESP="yy"). In addition, a normal write command where exclusive read response information is as write data (Write Data) is issued from the block A-2 to the PCIe®#1, and the PCIe®#1 receives the normal write command and issues a response indicating a successful of the normal write to the block A-2 (step S14: AW AWLOCK="00", W WDATA="yy", B BRESP="00").

Furthermore, read data or write data may be transferred from the PCIe®#1 to the PCIe®#0 (step S15). Additionally, a read data transfer for the normal read command is performed from the PCIe®#0 to the block A-1 (step S16: R RDATA="xxxx", RRESP="00"). Further, a normal write command where exclusive read response information is issued from the PCIe®#0 to the block B-2, and the block B-2 receives the normal write command and issues a response indicating the normal write to the PCIe®#0 (step S17: AW AWLOCK="00", W WDATA="yy", B BRESP="00") was successful. The exclusive read response Information is then transferred from the block B-2 to the block A-1 (step S18: W WDATA="yy"), the read data and the exclusive read response information are merged by block A-1, and an exclusive read response is transferred to the CPU #0 (step S19: R RDATA="xxxx", RRESP=yy).

As described above, for example, exclusive read processing may be realized between two semiconductor integrated circuits (SoCs) applying to AXI® specifications, wherein each of the two semiconductor integrated circuits include exclusive read functions connected by a PCIe®, wherein the PCIe does not include an exclusive read function. Specifically, a transfer of exclusive access may be possible between different bus specifications.

Figure 12:
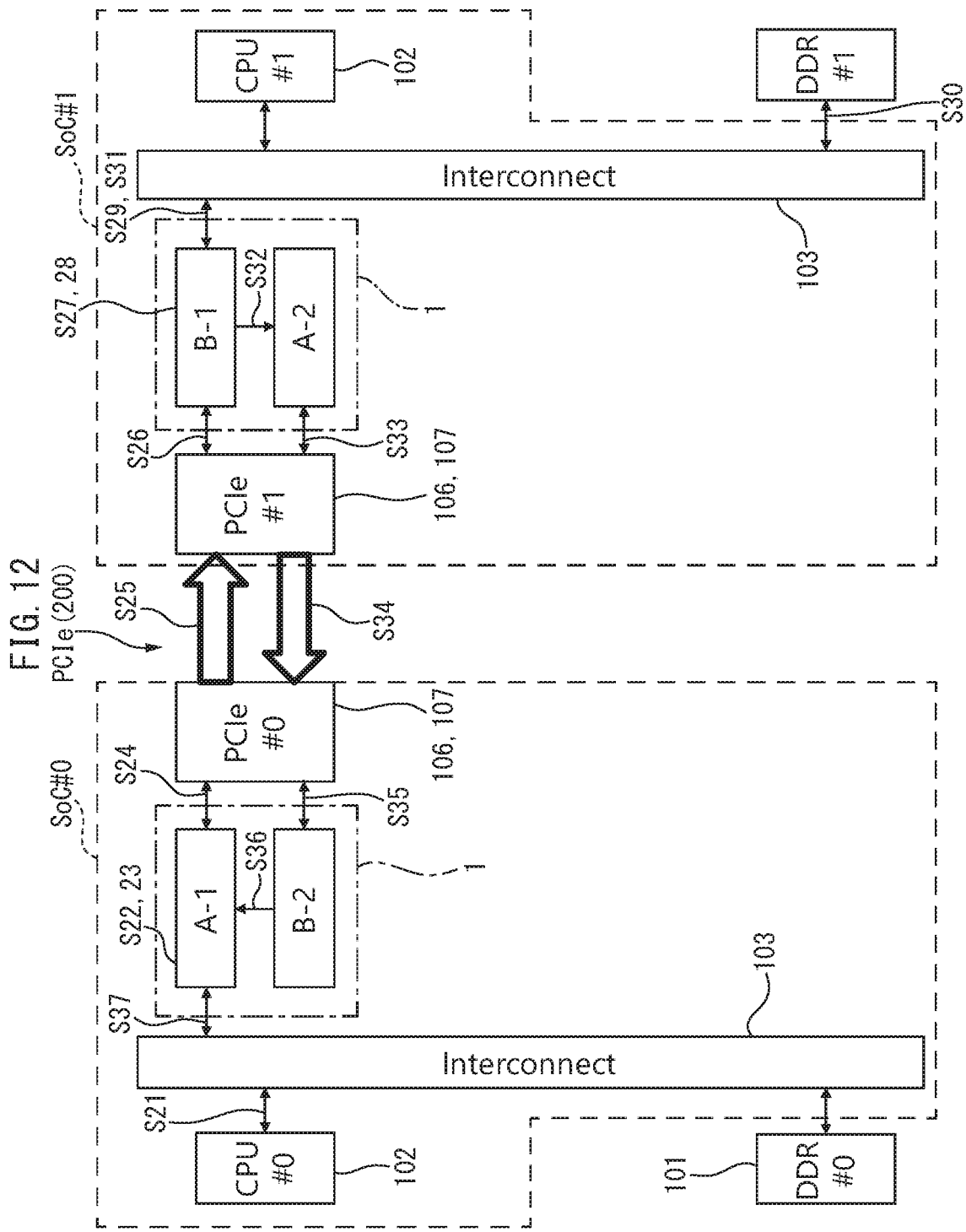
FIG. 12 is a diagram for explaining an example of a write access operation in the information processing device depicted in FIG. 1.
Figure 13:
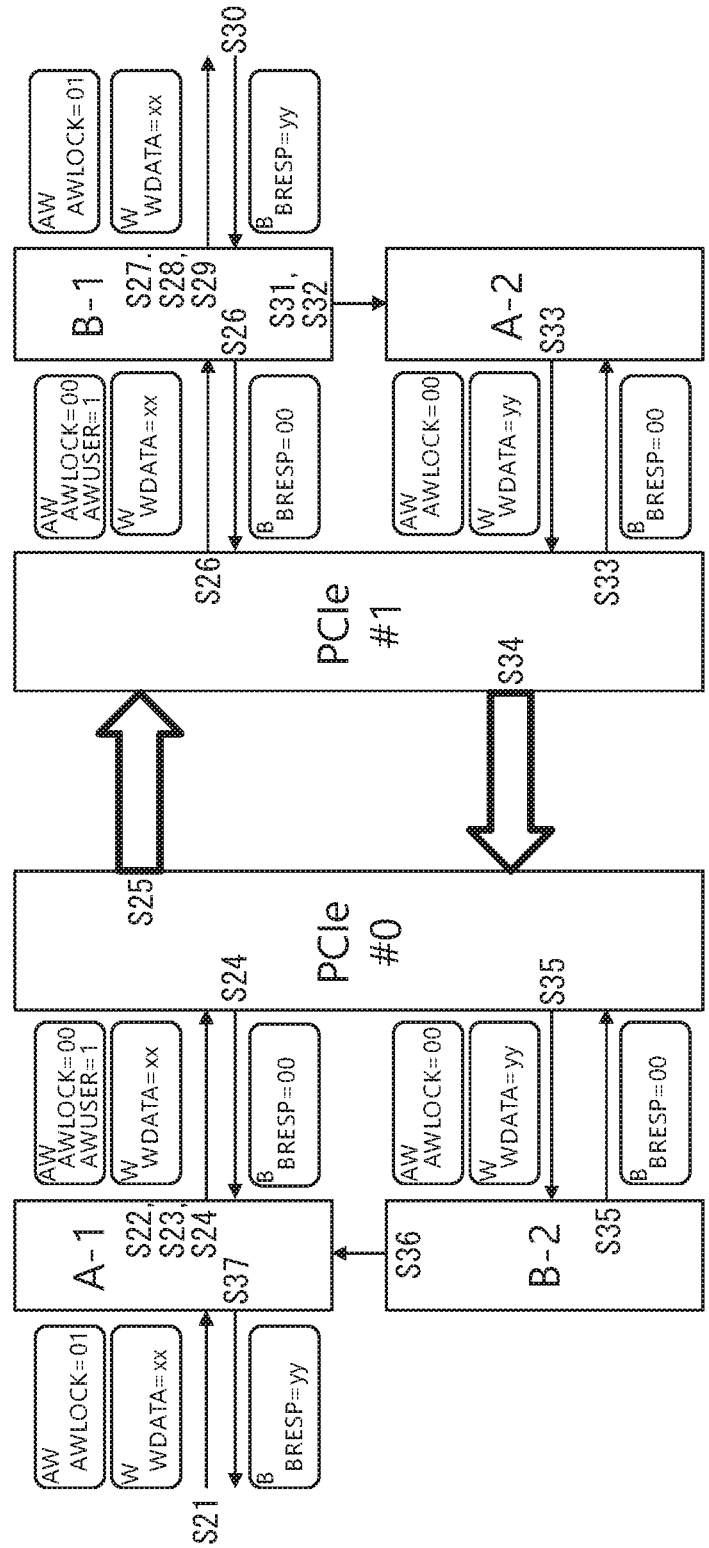
FIG. 13 is a diagram for explaining an example of an exclusive write access operation in the information processing device depicted in FIG. 12.

FIG. 12 is a diagram explaining an example write access operation in the information processing device depicted in FIG. 1. FIG. 13 is a diagram explaining both an document, example exclusive write access operation in the information processing device depicted in FIG. 12, and the conversion of an AXI® commend of an exclusive write access operation.

In FIG. 12 and FIG. 13, a bus used for exchanging commands or other information between an SoC #0 and an SoC #1 is an AXI® dealing with exclusive write access. The bus used for exchanging commands or various information between the SoC #0 and SoC #1 is a PCIe® not dealing with exclusive write access. Note that, in FIG. 13, a reference "xx" indicates write data, "yy" indicates exclusive responses. Further, AWUSER[x:0] is used for Misc signals (for example, exclusive access="1").

As depicted in FIG. 12 and FIG. 13, first, an exclusive write access (hereinafter also referred to as "exclusive write command") is issued from a CPU #0 (CPU 102 of the SoC #0) (step S21), and the exclusive write command is held in an exclusive command conversion block A-1 (step S22: AW AWLOCK="01", W WDATA="xx"). Next, exclusive write access information is set to Misc signals of an AXI® by the block A-1 (step S23). Further, a normal write command with Misc signals is issued from the block A-1 to a PCIe®#0 (external connection circuits 106, 107 of the SoC #0) (step S24: AW AWLOCK="00". AWUSER="1", W WDATA="xx").

Furthermore, for a write command including exclusive access control information as header Information from the PCIe®#0 to the PCIe®#1 (step S25), a the normal write command with Misc signals is issued from the PCIe®#1 to an exclusive command generation block B-1. Then, block B-1 receives the normal write command and issues a response indicating successful receipt (step S26: AW AWLOCK=00', AWUSER="1", W WDATA="xx", B BRESP=00). In addition, the normal write command with Misc signals is held and an exclusive write command is generated from exclusive write information of the Misc signals by the block B-1 (step S28).

Next, an exclusive write command is issued from the block B-1 to a DDR #1 (memory 101 of the SoC #1) (step S29: AW AWLOCK="01", W WDATA="xx"), the DDR #1 issues an exclusive write response (step S30), and the exclusive write response is held by the block B-1 (step S31: B BRESP "yy").

Further, Identification information for indicating an exclusive write response, including exclusive write response information is issued document, from the block B-1 to an exclusive response issuing block A-2 based on the exclusive write response held by the block B-1 (step S32: B BRESP by "yy"). In addition, a normal write command including exclusive write response information is issued from the block A-2 to the PCIe®#1, and the PCIe® #1 receives the normal write command and issues a response indicating the normal write to the block A2 was successful (step S33: AW AWLOCK="00", W WDATA="yy", B BRESP="00").

Furthermore, when write data is transferred from the PCIe®#1 to the PCIe®#0 (step S34), a normal write command including exclusive write response information is issued from the PCIe®#0 to an exclusive response receiving block B-2, where the block B-2 receives a normal write command and issues a response the normal write to the PCIe®#0 was successful (step S35: AW AWLOCK="00", W WDATA="yy", B BRESP="00"). In addition, the exclusive write response information is transferred from the block B-2 to the block A-1 (step S36), and the exclusive write response is transferred to the CPU #0 by the block A-1 (step S37: B BRESP="yy").

As described above, for example, an exclusive write processing may be realized between two semiconductor Integrated circuits (SoCs) applying to AXI® specifications and each including an exclusive write function, connected by a PCIe® which does not include an exclusive write function. Specifically, transfer of exclusive access may be possible between different bus specifications.

Figure 14:
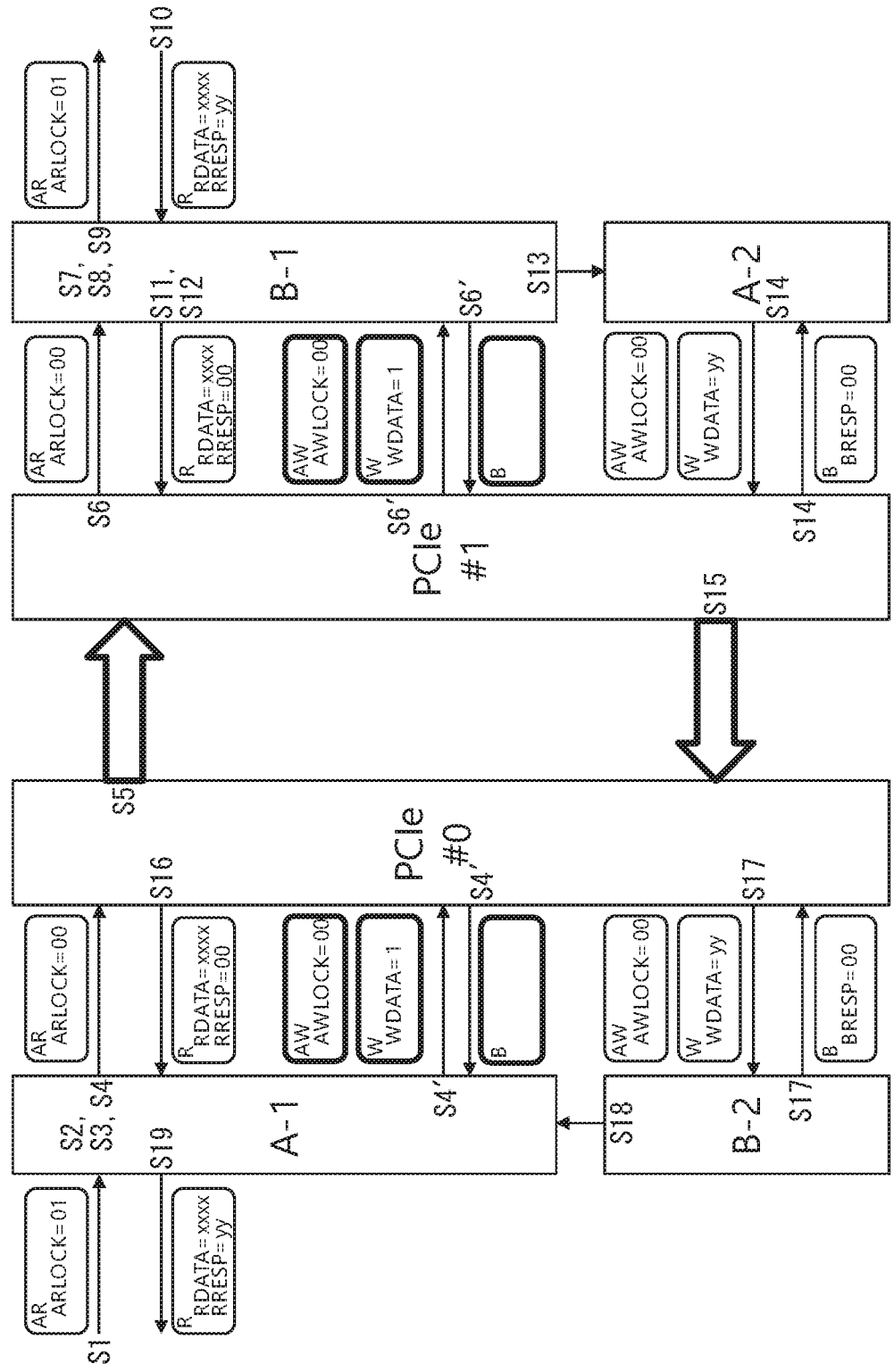
FIG. 14 is a diagram for explaining another example of an exclusive read access operation in the information processing device depicted in FIG. 10 and FIG. 11.

FIG. 14 is a diagram for explaining another example of an exclusive read access operation in the information processing device depicted in FIG. 10 and FIG. 11, and for explaining an example of performing an exclusive read access operation without using Misc signals of an AXI.

As is apparent by comparing FIG. 14 with FIG. 11, as described above, a modified example where an exclusive read access operation is performed without using Misc signals may be performed. As depicted in FIG. 11, S4' and S6' are additional steps provided to perform an exclusive read access operation without using Misc. signals.

Specifically, a step S4' is performed in addition to step S4 (AR ARLOCK="00", ARUSER="1") where a normal read is issued from the exclusive command conversion block A-1 document, to the PCIe®. In the step S4', exclusive read Information is Issued as a normal write command of the AXI® from the block A-1 to the PCIe® by AR ARLOCK="00", ARUSER="1". Further, the PCIe®#0 receives the normal write command, and Issues a response indicating successful receipt to the block A-1.

Further, step S6' is performed in addition to the step S6 (AR ARLOCK="00", ARUSER="1") where a normal read is Issued from the PCIe®#1 to an exclusive command generation block B-1. In the step S6', exclusive read Information is issued as a normal write command of the AXI® from the PCIe®#1 to the block B-1 by, for example, AW AWLOCK="00", W WDATA="1", and the block B-1 receives the normal write command, and issues a response indicating successful receipt to the PCIe®#1.

Furthermore, block B-1 generates an exclusive read command of the AXI® based on both the normal read command from step S6 and the normal write command of the exclusive read information from step S6'. Similarly, it may be possible to perform an exclusive write access operation without using Misc signals. Therefore, it is possible to realize exclusive access processing without using Misc signals of a PCIe®.

Figure 15:
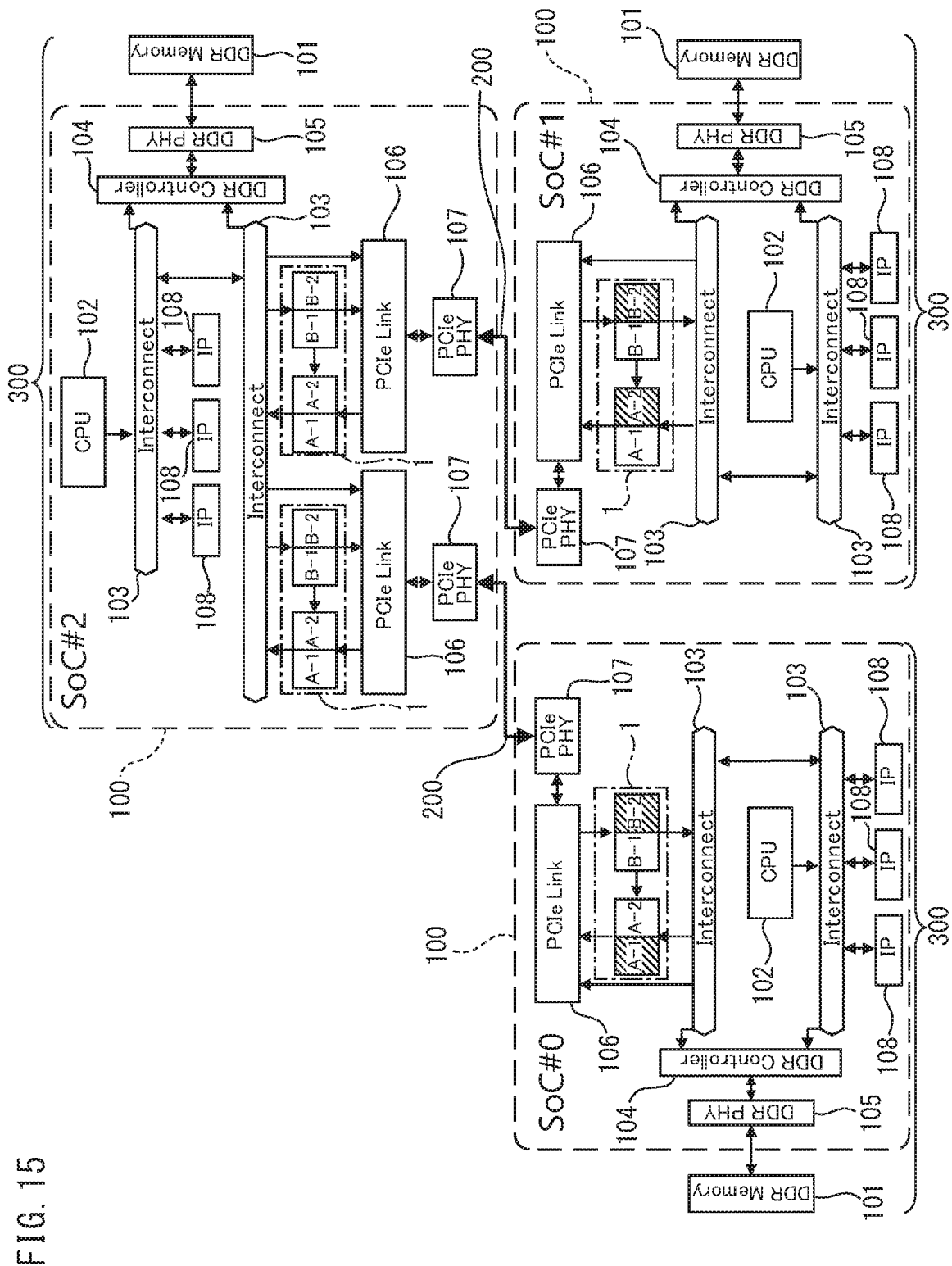
FIG. 15 is a block diagram depicting another example of an information processing device according to the present embodiment.

FIG. 15 is a block diagram depicting another example of an information processing device according to the present disclosure, in addition to depicting an example of an information processing device where three SoCs of AXI® specifications (SoC #0, SoC #1, SoC #2) 100 are connected by a PCIe® 200. Specifically, as is apparent from a comparison FIG. 15 with FIG. 1 described above, the Information processing device depicted in FIG. 15 includes an additional SoC #2 within the information processing device depicted in FIG. 1.

Here, a circuit board 300 includes a motherboard and two circuit boards 300 (SoC #0, SoC #1), wherein the two circuit boards 300 are Inserted to sockets of the mother board (SoC #2). Note that, in SoC #0 to SoC #2, each of the SoCs include either a SoC number for identifying each SoC, or a port number so as to identify each circuit board 300 mounting the SoC 100.

Note that FIG. 15 depicts, for example, the case where the CPU 102 of the SoC #0 accesses the memory 101 connected to the SoC #1, and blocks A-1 and B-2 in a bus control circuit 1 of the SoC #0 are activated (ON). Further, two external connection circuits (106, 107) and the bus control circuit 1 are provided for the SoC #2, and in the case of accessing between the SoC #0 and SoC #1, the blocks A-1, A-2, B-1 and B-2 of the bus control circuit 1 are all inactivated (OFF). Furthermore, the number of SoCs 100 (circuit board 300) is not limited to two or three, and a larger number of SoCs (circuit board) of may be connected, as described above.

Figure 16:
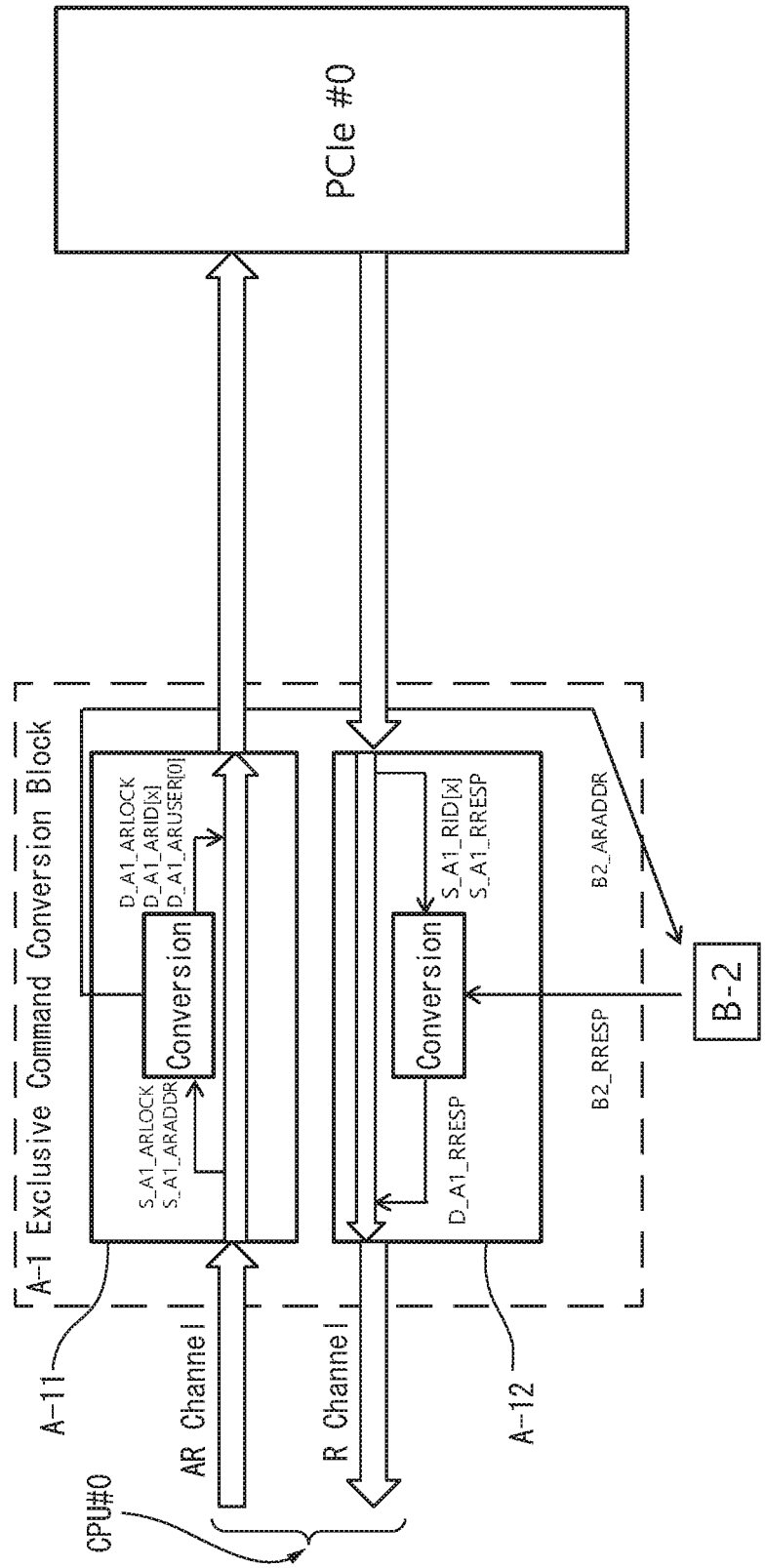
FIG. 16 is a diagram for explaining an example of an exclusive command conversion block for a read channel in the bus control circuit depicted in FIG. 2.

FIG. 16 is a diagram for explaining an example of an exclusive command conversion block for a read channel in the bus control circuit depicted in FIG. 2. As depicted in FIG. 16, the exclusive command conversion block A-1 includes a block A-11 for performing conversion processing of a read address (RA) channel and a block A-12 for performing conversion processing of read data (R) channel, at the time of a read access operation as described with reference to FIG. 10 and FIG. 11.

The block A-11 receives S_A1_ARLOCK and S_A1_ARADDR from the CPU #0 (internal connection circuit 103) by the step S1 depicted in FIG. 10 and FIG. 11, converts into D_A1_ARLOCK, D_A1_ARID[x] and D_A1_ARUSER[0], and outputs to the PCIe®#0 (step S4). Note that, as described in detail, S_A1_ARLOCK and S_A1_ARADDR are used as D_A1_ARLOCK and D_A1_ARADDR.

Specifically, the block A-11 outputs D_A1_ARLOCK="00" (normal access), D_A1_ARID[x]="1" (for an exclusive command identification of R-channel, in addition to ARID[x-1:0] of x bits), and D_A1_ARUSER[0]="1" (exclusive command information) to the PCIe®#0, when S_A1_ARLOCK="01" (exclusive access). Further, the block A-11 transfers the value of D_A1_ARADDR to the exclusive response receiving block B-2 as B2_ARADDR (for command identification), when S_A1_ARLOCK="01".

In addition, the block A-11 receives S_A1_ARLOCK and S_A1_ARADDR, converts into D_A1_ARLOCK=S_A1_ARLOCK, D_A1_ARID[x]="0" and D_A1_ARUSER[0]="0", and outputs to the PCIe®#0.

The block A-12 receives S_A1_RID[x] and S_A1_RRBSP from the PCIe®#0 by step S16 depicted in FIG. 10 and FIG. 11, and then converts them into D_A1_RRESP, and outputs the result to an internal connection circuit 103 in step S19. Specifically, block A-12 outputs the exclusive response value D_A1_RRESP=B2_RRES to the CPU #0, when S_A1_RID[x]=is "1". Further, the block A-12 outputs the exclusive response value D_A1_RRESP=S_A1_RRESP to the CPU #0, when S_A1_RID[x]="0". Note that the block B-2 outputs B2_RRESP to the block A-12.

Figure 17:
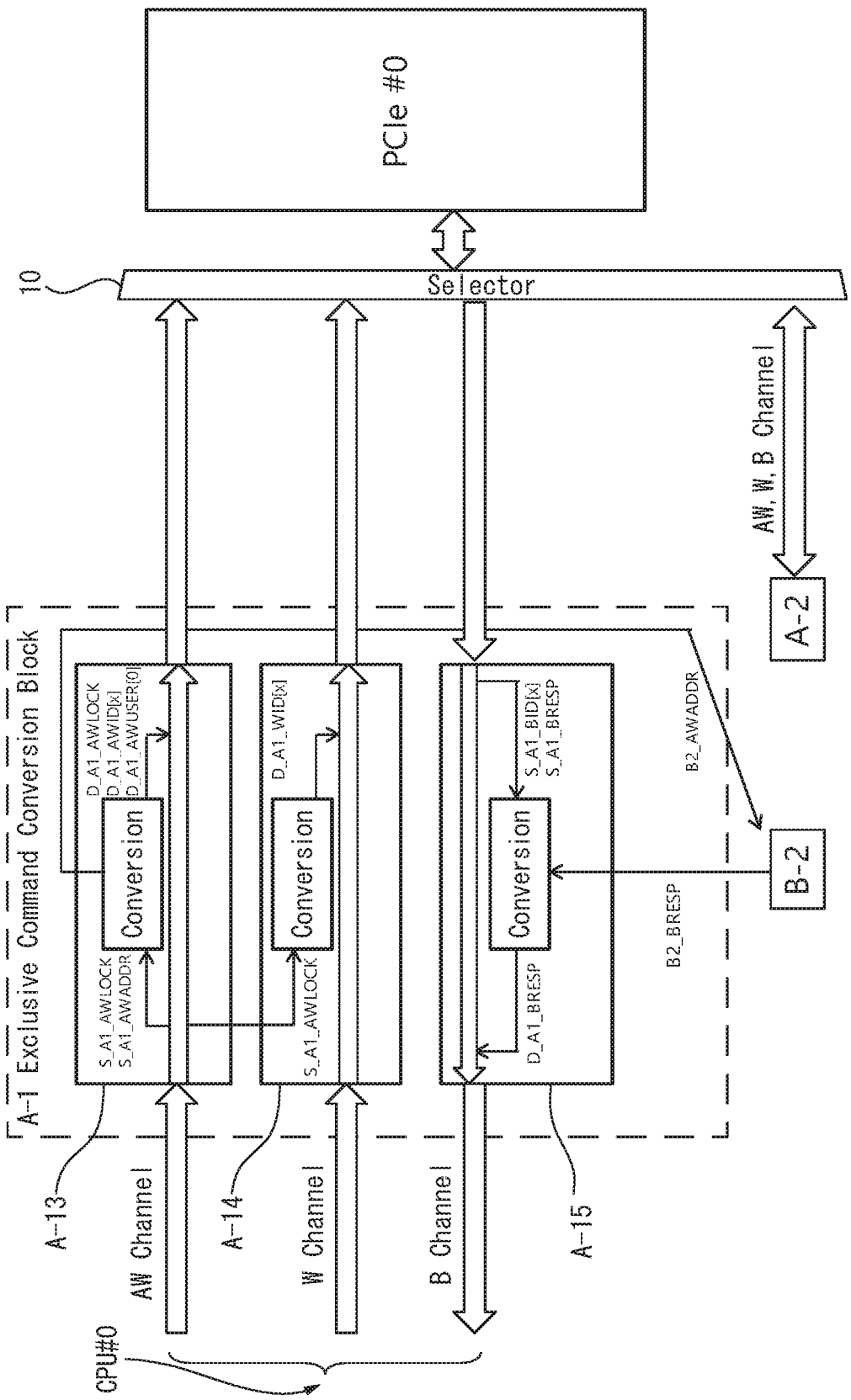
FIG. 17 is a diagram for explaining an example of an exclusive command conversion block for a write channel in the bus control circuit depicted in FIG. 2.

FIG. 17 is a diagram explaining an example exclusive command conversion block for a write channel in the bus control circuit depicted in FIG. 2. As depicted in document, FIG. 17, the exclusive command conversion block A-1 includes a block A-13 for performing a conversion process of a write address (AW) channel, a block A-14 for performing a conversion process of write data (W) channel, and a block A-15 for performing a write response (B) channel at the time of a write access operation, as described with reference to FIG. 12 and FIG. 13.

The block A-13 receives S_A1_AWLOCK and S_A1_AWADDR from the CPU #0 by step S16, depicted in FIG. 12 and FIG. 13, and converts them Into D_A1_AWLOCK, D_A1_AWID[x] and D_A1_AWUSER, and outputs the result to a selector 10 (PCIe®#0) as described in steps S22 to S24. Here, as described in detail below, S_A1_AWLOCK and S_A1_AWADDR are used as D_A1_AWLOCK and D_A1_AWADDR.

Specifically, the block A-13 outputs D_A1_AWLOCK="00" (normal access), D_A1_AWID[x]="1" (for an exclusive command identification of B-channel, in addition to AWID[x-1:0] of x bits), and D_A1_AWUSER[0]=outputs "1" (exclusive command information) to the selector 10, when S_A1_AWLOCK="01" (exclusive access). Further, the block A-13 transfers the value of D_A1_AWADDR to the exclusive response receiving block B-2 as B2_AWADDR (for command identification), when S_A1_AWLOCK="01".

In addition, the block A-13 receives S_A1_AWLOCK and S_A1_AWADDR, converts D_A1_AWLOCK=S_A1_AWLOCK, D_A1_AWID[x]="0" and D_A1_AWUSER[0]="0", and outputs to a selector 10, when S_A1_AWLOCK=not "01". Here, S_A1_AWLOCK indicating whether an exclusive access is determined to 2-bit data ("01"), however, it may be possible as one bit data ("0" or "1").

The bock A-14 receives S_A1_AWLOCK from the CPU #0 by the step S21 depicted in FIG. 12 and FIG. 13, converts into D_A1_WID[x], and outputs to the selector 10 (PCIe #0) (step S22 to S24). Specifically, the block A-14 outputs D_A1_WID[x]="1" (so as to match the AW channel), when S_A1_AWLOCK="01" (exclusive access), and outputs D_A1_WID[x]="0", when S_A1_AWLOCK=not "01". Note that the output of the block A-14 (D_A1_WID[x]) is input to the selector 10.

The block A-15 receives S_A1_BID[x] and S_A1_BRESP as a input, converts the input into D_A1_BRESP, and outputs the result to the internal connecting circuit 103 (CPU #0) (step S37). Specifically, the block A-15 outputs D_A1_BRESP=B2_BRESP (exclusive response value) to the CPU #0, when S_A1_BID[x]="1", and outputs D_A1_BRESP=S_A1_BRESP to the CPU #0, when S_A1_BID[x]="0". Here, the exclusive response receiving block B-2 outputs B2_BRESP to the block A-15. Further, output signals of the exclusive response issuing block A2 (outputs of AW, W and B channels) are also inputted to selector 10, and the selector selects the output of the block A-2 when receiving an exclusive response issuing identification signal (SS) which will be described later with reference to FIG. 21, and otherwise, selects the output of the block A-1.

Figure 18:
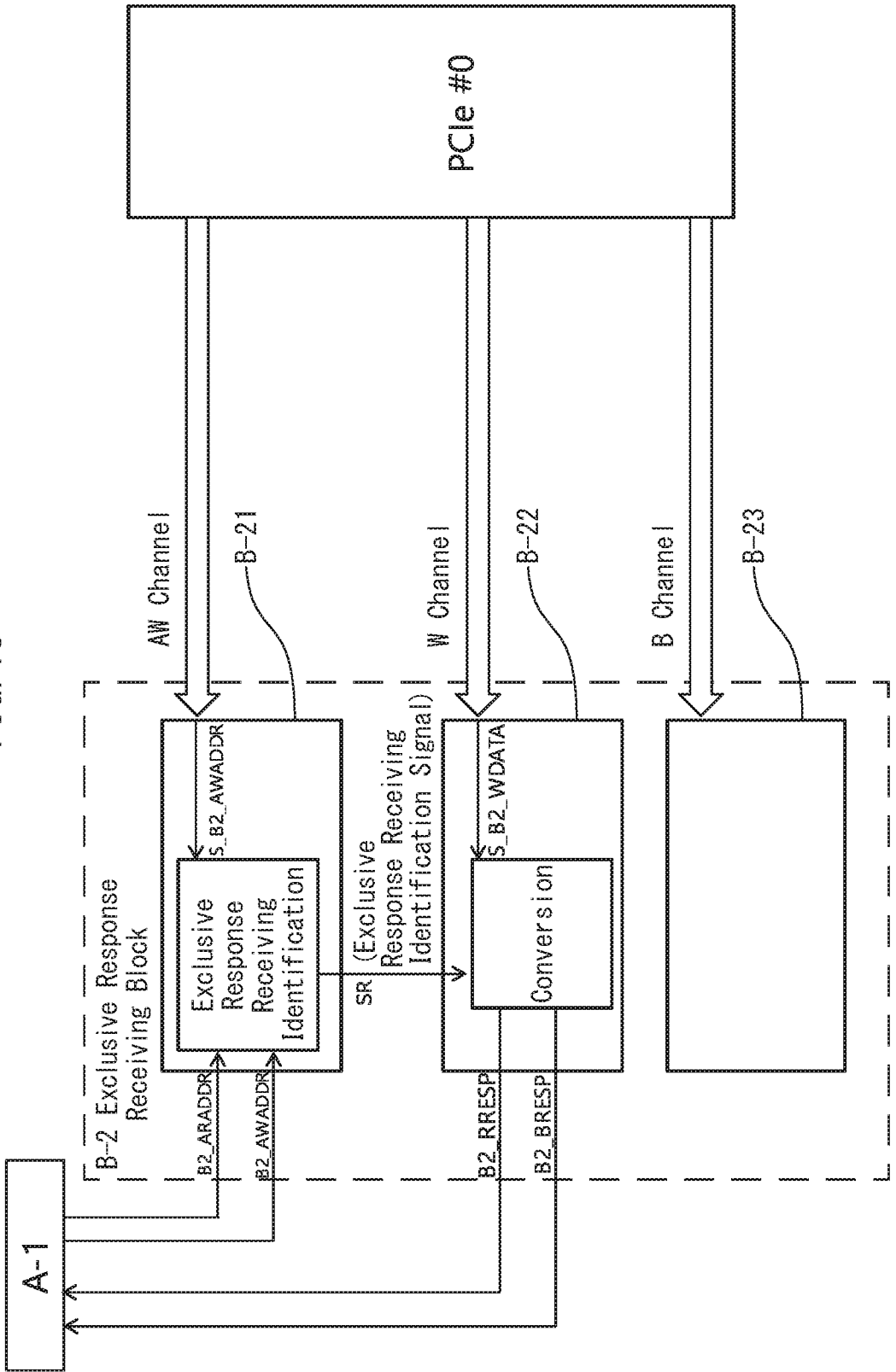
FIG. 18 is a diagram for explaining an example of an exclusive response receiving block for a read channel in the bus control circuit depicted in FIG. 2.

FIG. 18 is a diagram explaining an example exclusive response receiving to block for a read channel in the bus control circuit depicted in FIG. 2. As depicted in FIG. 18, the document, exclusive response receiving block B-2 includes three blocks B-21, B-22 B-23 for performing a transfer process and conversion process between the exclusive command conversion block A-1 and the PCIe®#0, at the time of an access operation as described with reference to FIG. 10 to FIG. 13.

The block B-21 receives B2_ARADDR and B2_AWADDR from the exclusive command conversion block A-1, and also receives S_B2_AWADDR from an AW channel of the PCIe®#0, and generates an output including an exclusive response receiving Identification signal (SR) to the block B-22. Specifically, in block B-22, when S_B2_AWADDR is coincident with B2_ARADDR or B2_AWADDR, it is determined that the exclusive response is an exclusive access command issued from the block A-1, and the block B-21 outputs an exclusive access response receiving identification signal SR to the block B-22.

The block B-22 receives S_B2_WDATA from the PCIe®#0 through a W channel, converts the S_B2_WDATA into B2_RRESP and B2_BRESP based on the exclusive response receiving identification signal SR from the block B-21, and outputs the result to the block A-1. Specifically, when a response is confirmed as an exclusive access response for the exclusive access command issued from the block A-1 based on the exclusive response receiving identification signal SR, the exclusive response value on S_B2_WDATA is transferred to the block A-1 as B2_RRESP or B2_BRESP. Note that the block B-23 is a block used to receive write response (B) channel information from the PCIe®#0, however, the block B-23 is thin relationship with the present embodiment and descriptions thereof will be omitted.

Figure 19:
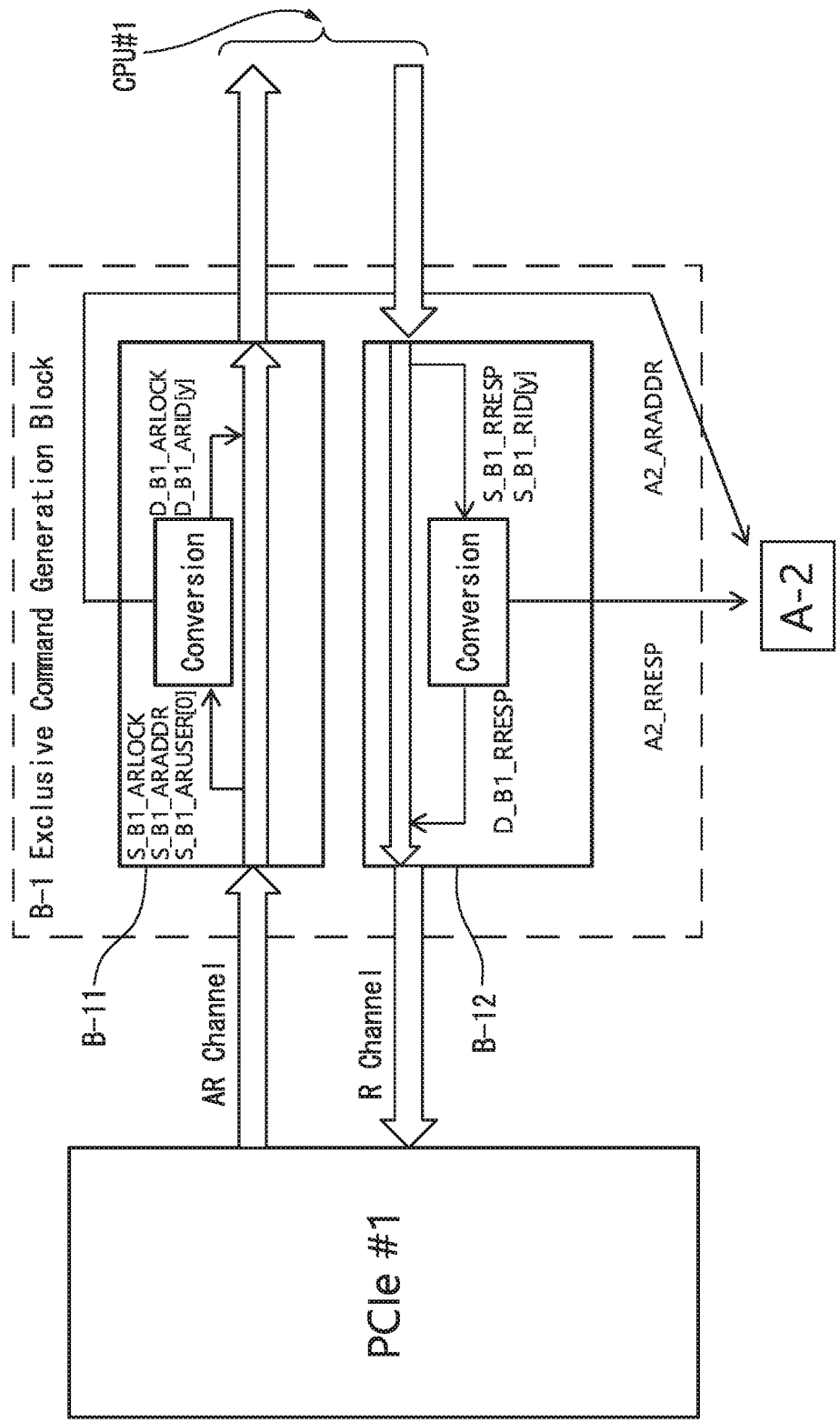
FIG. 19 is a diagram for explaining an example of an exclusive command generation block for the read channel in the bus control circuit depicted in FIG. 2.

FIG. 19 is a diagram for explaining an example of an exclusive command generation block for the read channel in the bus control circuit depicted in FIG. 2. As depicted in FIG. 19, the exclusive command generation block B-1 includes a block B-11 for performing a conversion processing of the an AR channel, and a block B-12 for performing a conversion processing of an R channel, at the time of a read access operation as described with reference to FIG. 10 and FIG. 11.

The block B-11 receives S_B1_ARLOCK, S_B1_ARADDR and S_B1_ARUSER from the PCIe®#1 as the step S6 depicted in FIG. 10 and FIG. 11, converts into D_B1_ARLOCK and D_B1_ARID[y], and outputs to the Internal connection circuit 103 (DDR #1) (steps S7 to S10).

Specifically, the block B-11 outputs D_B1_ARLOCK="01" (exclusive command), and D_B1_ARID[y]="1" (for an exclusive command identification of R channel, in addition to ARID[y-1:0] of y bits) to the DDR #1, when S_B1_ARUSER[0]="1" (exclusive command). Further, the block B-11 transfers the value of D_B1_ARADDR to the exclusive response issuing block A-2 as A2_ARADDR (for command identification), when S_B1_ARUSER="1". In addition, the block B-11 outputs D_B1_ARLOCK=S_B1_ARLOCK, and D_B1_ARID[y]="0" to the DDR #1, when S_B1_ARUSER[0]="0".

The block B-12 receives S_B1_RRESP and S_B1_RID[y] as the step S11 depicted in FIG. 10 and FIG. 11, and converts into D_B1_RRESP, and outputs to the PCIe®#1 (step S12). Specifically, the block B-12 outputs D_B1_RRESP="00" and A2_RRESP=S_B1_RRESP (exclusive response value) to the PCIe®#1, when S_B1_RID[y]="1". Further, the block B-12 outputs A2_RRESP to the block A-2.

Figure 20:
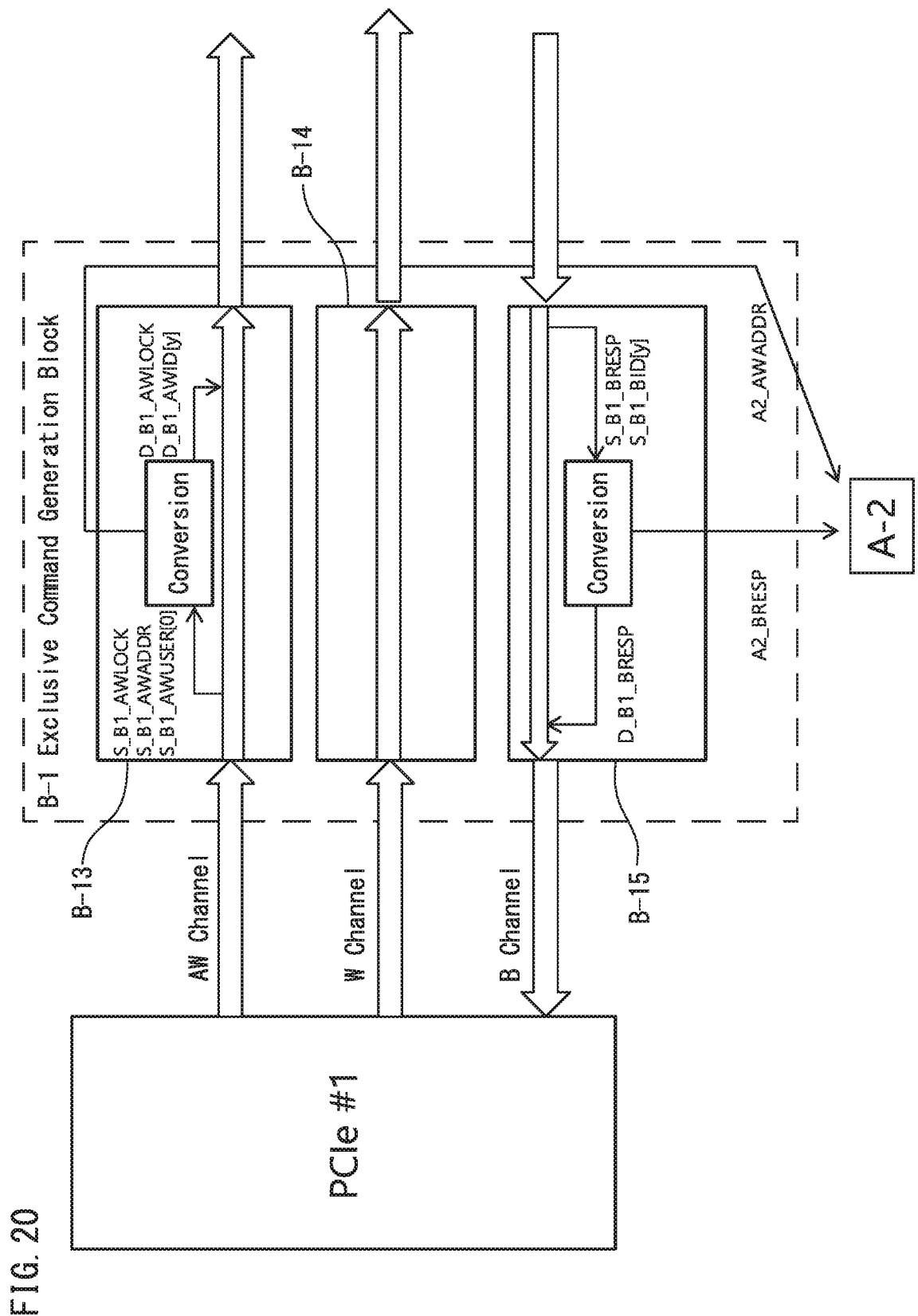
FIG. 20 is a diagram for explaining an example of an exclusive command generation block for the write channel in the bus control circuit depicted in FIG. 2.

FIG. 20 is a diagram for explaining an example of an exclusive command generation block for the write channel in the bus control circuit depicted in FIG. 2. As depicted in FIG. 20, the exclusive command generation block B-1 includes a block B-13 for performing a conversion processing of an AW channel, a block B-14 for performing a conversion processing of a W channel, and a block B-15 for performing a conversion processing of a B channel, at the time of a write access operation as described with reference to FIG. 12 and FIG. 13.

The block B-13 receives S_B1_AWLOCK, S_B1_AWADDR and S_B1_AWUSER[0] from the PCIe®#1 by the step 26 depicted in FIG. 12 and FIG. 13, converts into D_B1_AWLOCK and D_B1_AWID[y], and outputs to the internal connection circuit 103 (DDR #1) (steps S27 to S30).

Specifically, the block B-13 outputs D_B1_AWLOCK="01" (exclusive command), D_B1_AWID[y]="1" (for an exclusive command identification of a B channel, in addition to AWID[y-1:0] of y bits), and a value of D_B1_AWADDR to the exclusive response issuing block A-2, when S_B1_AWUSER[0]="1" (exclusive command). In addition, the block B-13 outputs D_B1_AWLOCK=S_B1_AWLOCK and D_B1_AWID[y]="0" to the DDR #1, when S_B1_AWUSER[0]="0".

The block B-15 receives S_B1_BRESP and S_B1_BID[y], converts into D_B1_BRESP, and outputs to the PCIe®#1. Specifically, the block B-15 outputs D_B1_BRESP="00", and A2_BRESP=S_B1_BRESP (exclusive response value) to the PCIe®#1, when S_B1_BID[y]="1". Further, the block B-15 outputs A2_BRESP to the block A-2.

In addition, the block B-15 outputs D_B1_BRESP=S_B1_BRESP to the PCIe®#1, when S_B1_BID[y]="0". Note that the block B-14 passes and outputs data of W channel from the PCIe®#1 to the DDR #1.

Figure 21:
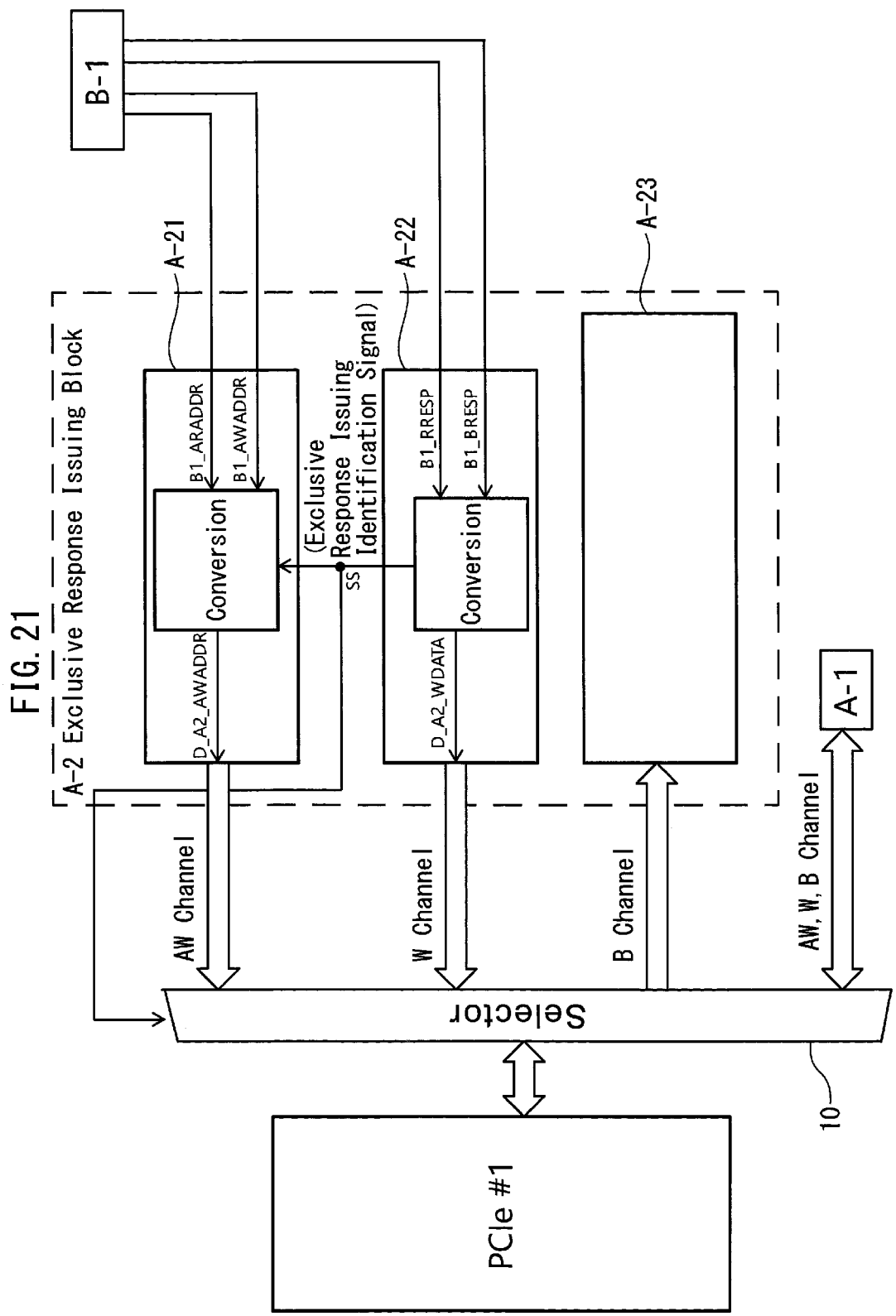
FIG. 21 is a diagram for explaining an example of an exclusive response issuing block for the write channel in the bus control circuit depicted in FIG. 2.

FIG. 21 is a diagram explaining an example exclusive response issuing block for the write channel in the bus control circuit depicted in FIG. 2. As depicted in FIG. 21, an exclusive response issuing blocks A-2 includes a block A-21 for performing a conversion process of an AW channel, and a block A-23 for performing a conversion process of a W channel, at the time of a write access operation as described with reference to FIG. 12 and FIG. 13.

The block A-21 receives B1_ARADDR and B1_AWADDR from the exclusive command generation block B-1 by the step S32 depicted in FIG. 12 and FIG. 13, converts into D_A2_AWADDR, and outputs to a selector 10 (PCIe®#1) (step S13). Specifically, the block A-21 issues an AW command for an exclusive response to an AW channel (selector 10) by transferring B1_ARADDR or B1_AWADDR as D_A2_AWADDR, when receiving an exclusive response issuing identification signal SS from a block A-22 which will be described later. The block A-22 receives B1_RRESP and B1_BRESP from the block B-1, converts into D_A2_WDATA, and outputs to a selector (PCIe®#1). Specifically, the block A-22 transfers an exclusive response issuing identification signal SS to the AW channel and the selector 10 so as to issue an exclusive response, when the block A-22 receives B1_RRESP or B1_BRESP. Further, a value of B1_RRESP or B1_BRESP is converted as an exclusive value of D_A2_WDATA. Note that an explanation of the block A-23 is omitted, since the relationship is thin.

Here, as depicted in FIG. 21 and FIG. 17, the selector 10 is provided between the PCIe®#1, and the exclusive command conversion block A-1 and the exclusive responses issuing blocks A-2, and signals selected by the selector 10 are transferred between the PCIe®#1, and the block A-1 or A-2. Specifically, in the case of receiving an exclusive response issuing identification signal SS, the selector 10 selects a path A-2, and otherwise, the selector 10 selects a path A-1.

Figure 22:
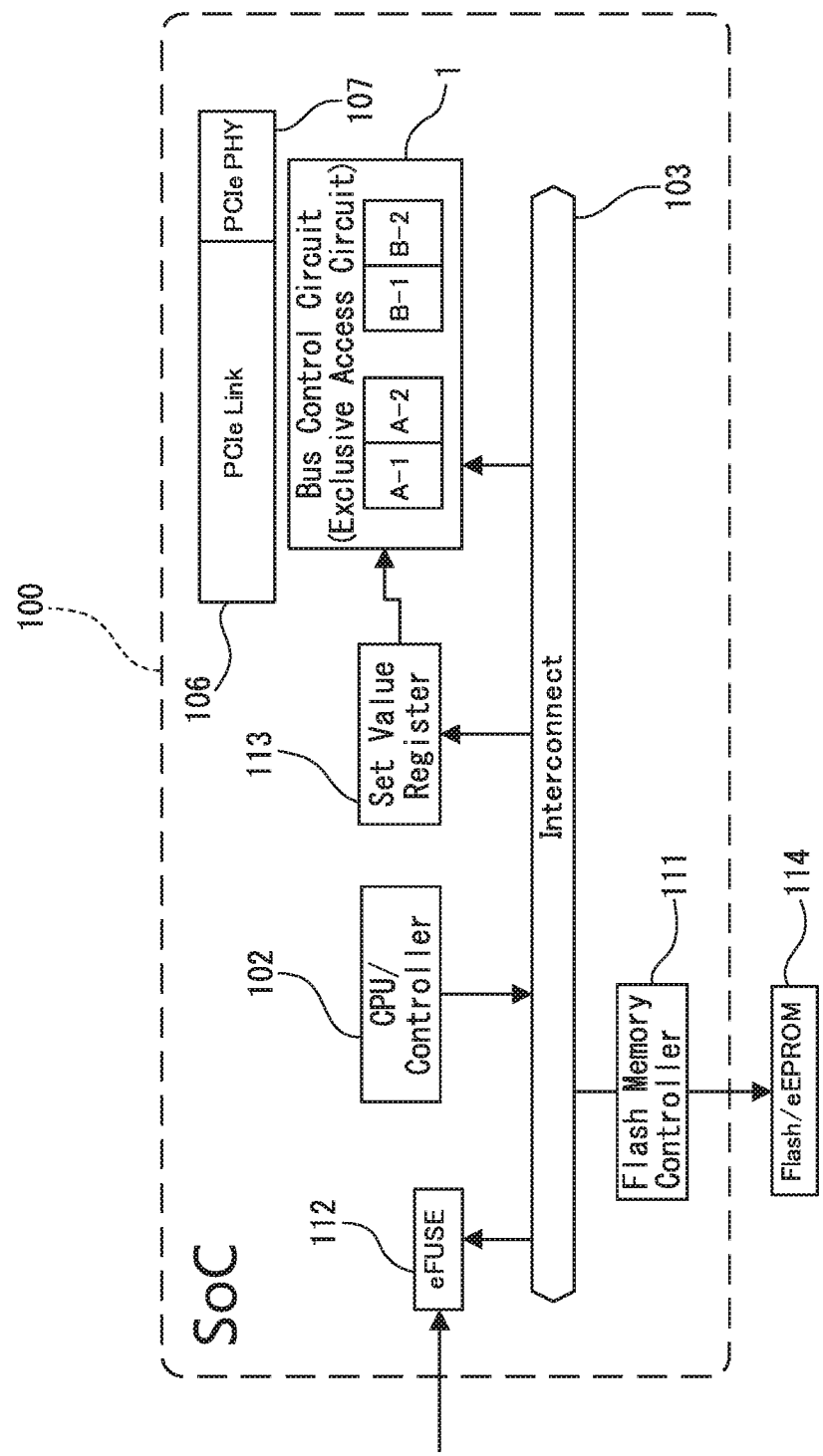
FIG. 22 is a diagram for explaining a method of generating/restoring header information including ST bits [7:0] in the information processing device with reference to FIG. 1 and FIG. 2 (Part 1)
Figure 23:
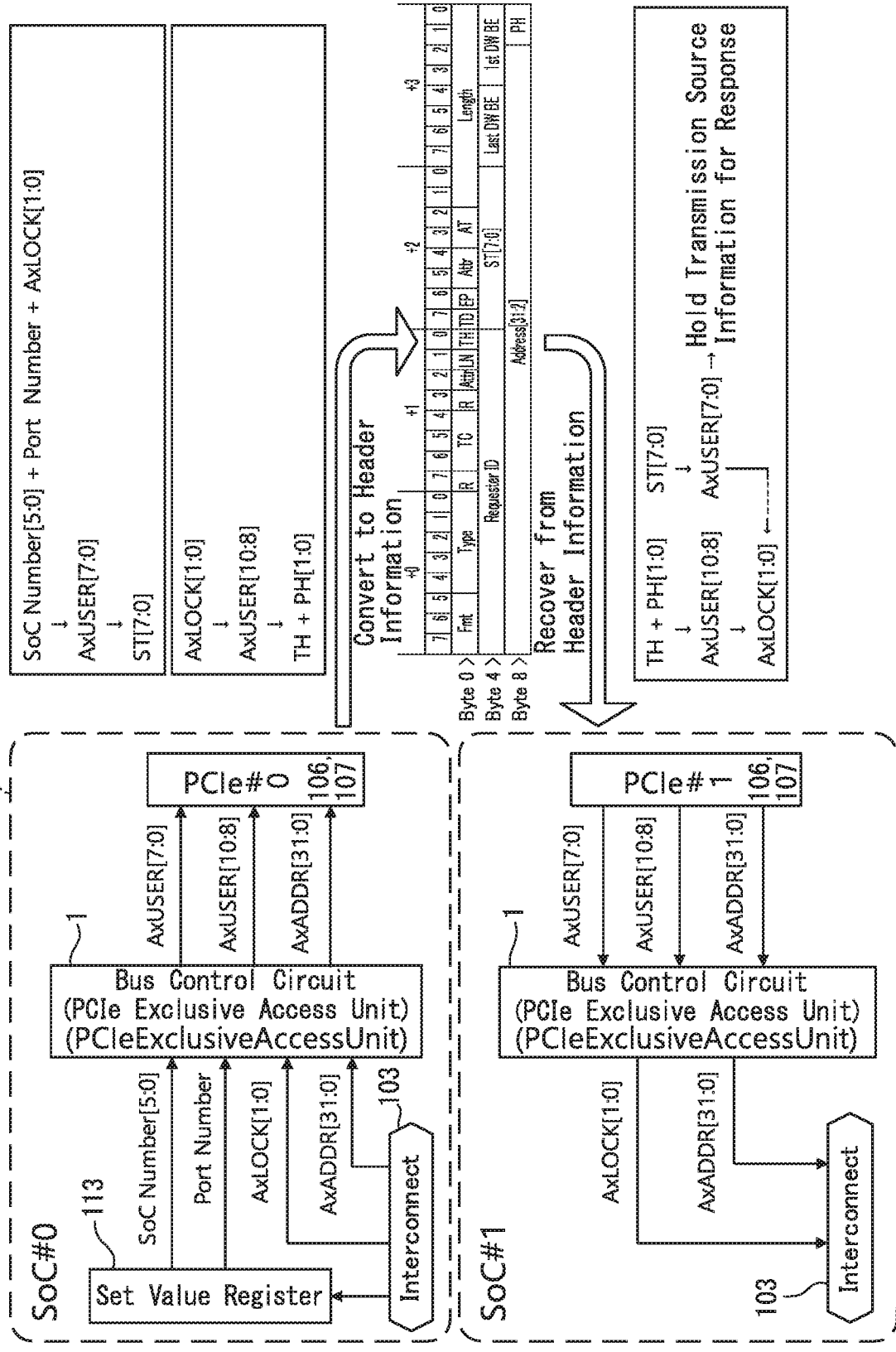
FIG. 23 is a diagram for explaining the method of generating/restoring header information including ST bits [7:0] in the information processing device with reference to FIG. 1 and FIG. 2 (Part 2).

FIG. 22 and FIG. 23 are diagrams for explaining a method of generating restoring header information including ST bits [7:0] in the information processing device with reference to FIG. 1 and FIG. 2, and for explaining an acquisition of information of SoC numbers or port numbers indicated with reference to FIG. 15. Note that, in FIG. 22 and FIG. 23, for example, a memory (DDR memory 101), memory connection circuits (104, 105), IP macros (108) and the like are omitted, since the relationship is thin.

As depicted in FIG. 22, an SoC 100 includes, for example, a flash memory controller 111, an electronic fuse (eFUSE) 112 and the set value register 113, in addition to the SoC described with reference to FIG. 1. Note that the flash memory controller 111 controls, for example, the flash memory (or, eEPROM) 114 provided outside of the 114 controls the flash memory controller 111.

The flash memory controller 111 includes an electronic fuse (eFUSE) 112 and a set value register 113. Note that the flash memory controller 111 controls, for example, a flash memory or a nonvolatile memory (Electrically Erasable Programmable Read-Only Memory: Flash/eEPROM: external memory) 114 provided outside of the flash memory controller 111.

The external memory (Flash/EEPROM) 114 or electronic fuse 112 stores previously SoC numbers or port numbers, for example, when power is turned ON, a CPU (or controller) 102 reads out values stored in the external memory 114 or the electronic fuse 112, and copies to a setting value register 113. Further, the values copied to the setting value register 113 are read out by the bus control circuit (exclusive access circuit) 1, and in a state where each of the SoCs is identified, an exclusive access processing described above is performed. Note that the CPU 102 may set the values read out from the external memory 114 or the electronic fuses 112 directly to the bus control circuit 1 without passing through the setting value register 113.

Concretely, as depicted in FIG. 23, ST bit (ST[7:0]) in the PCIe® TLP header described with reference to FIG. 3 may be used. Specifically, the bus control circuit (PCIe® Exclusive Access Unit) 1 reads out, for example, SoC numbers of the SoC #0 (SoC Number [5:0]) and port numbers from the setting value register 113. Further, AxLOCK[1:0] and AxADDR[31:0] are read out through the internal connection circuit (Interconnect) 103, for example, by performing the process described above, and AxUSER[7:0], AxUSER[10:8] and AxADDR[31 0] may be output to the PCIe®#.

Here, data of the SoC #0 is converted (generated) as, for example, SoC Number [5:0]+Port Number+AxLOCK[1:0]→AxUSER[7:0]→ST[7:0], and converted to header information by performing conversions as AxLOCK

[1:0]→AxUSER[10:8]→TH+PH[1:0]. As described above, AxLOCK is, for example, a two-bot signal such as AxLOCK [1:0], however, AxLOCK may be one-bit signal, for example, "01" indicates an exclusive access and "00" indicates a normal access. Further, AxUSER[10:8], which may transfer information of 3 bits, for example, in this case, one bit is fixed and other two bits may be used.

As described above, for example, information embedded in ST[7:0], TH and PH[1:0] of a TLP header in the PCIe® is, for example, recovered in the SoC #1. Specifically, for example, TH+PH[1:0] AxUSER[10:8] AxLOCK[1:0], and also ST[7:0] AxUSER[7:0] response for transmission source Information holding to recover the information embedded in the TLP header in the PCIe®. Therefore, in the SoC #1, AxUSER[7:0], AxUSER[10:8] and AxADDR[31:0] is input from the PCIe®#1 to the bus control circuit 1, and AxLOCK [1:0] and AxADDR[31:0] are output from the bus control circuit to the 1 internal connection circuit 103. Note that, in the SoC #1, a setting value register 113 may be also provided, and steps of a reverse direction (from SoC #1 to SoC #0) in the above descriptions may be possible to perform. Further, the use of ST[7:0], TH and PH[1:0] of the TLP header described above is only an example, and other bit fields of the header or appropriate bits fields in each bus specification may be also possible to use.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A bus control circuit configured to transfer access commands for performing exclusive access between a first bus specification and a second bus specification by converting from a first exclusive access command, the first exclusive access command including a first format applying to the first bus specification which deals with exclusive access and being an access command previously provided, based on the first bus specification, into a second exclusive access command, the second exclusive access command including a second format applying to the second bus specification that does not deal with exclusive access and being generated based on a certain bit field in the second bus specification so as to perform the exclusive access, and by converting from the second exclusive access command into the first exclusive access command, the bus control circuit comprising:
   an exclusive access command conversion circuit configured to receive the first exclusive access command, convert the first exclusive access command into the second exclusive access command, and output the second exclusive access command, when converting from the first exclusive access command into the second exclusive access command;
   an exclusive access command generation circuit configured to receive the second exclusive access command and generate the first exclusive access command, when converting from the second exclusive access command into the first exclusive access command;
   an exclusive access response issuing circuit configured to issue exclusive access response information for the second exclusive access command, when converting from the second exclusive access command into the first exclusive access command; and
   an exclusive access response receiving circuit configured to receive exclusive access response information for the second exclusive access command, when converting from the first exclusive access command into the second exclusive access command.

2. The bus control circuit according to claim 1, wherein the certain bit field in the second bus specification used for generating the second exclusive access command is included in a header portion of a packet in the second bus specification.

3. The bus control circuit according to claim 1, further comprising:
   a selector configured to control a selection between a path coupled to a second bus applying to the second bus specification, and a path according to the exclusive access command conversion circuit or a path according to the exclusive access command issuing circuit, based on an exclusive access response issuing identification signal output from the exclusive access response issuing circuit.

4. The bus control circuit according to claim 1, wherein when converting from the first exclusive access command to the second exclusive access command,
   the exclusive access response receiving circuit is configured to issue exclusive access command response information for the second exclusive access command to the exclusive access command conversion circuit, and
   the exclusive access command conversion circuit is configured to generate an exclusive access response for the first exclusive access command based on the exclusive access command response information for the second exclusive access command.

5. The bus control circuit according to claim 4, wherein when converting from the first exclusive access command to the second exclusive access command,
   the exclusive access command conversion circuit is configured to receive an access response for a normal access command, and generate an exclusive access response for the first exclusive access command, based on the access response for the normal access command and the exclusive access command response information for the second exclusive access command.

6. The bus control circuit according to claim 1, wherein when converting from the second exclusive access command to the first exclusive access command,
   the exclusive access command generation circuit is configured to receive an exclusive access response for the first exclusive access command, and issue an exclusive access response information for the first exclusive access command to the exclusive access response issuing circuit, based on the exclusive access response for the first exclusive access command, and
   the exclusive access response issuing circuit is configured to generate an exclusive access response information for the second exclusive access command, based on the exclusive access response information for the first exclusive access command.

7. The bus control circuit according to claim 6, wherein when converting from the second exclusive access command to the first exclusive access command,
   the exclusive access command generation circuit is configured to generate an access response to a normal access command, in addition to the exclusive access response information for the first exclusive access command, based on the exclusive access response for the first exclusive access command.

8. A semiconductor integrated circuit comprising:
a bus control circuit configured to transfer access commands for performing exclusive access between a first bus specification and a second bus specification by converting from a first exclusive access command, the first exclusive access command including a first format applying to the first bus specification which deals with exclusive access and being an access command previously provided, based on the first bus specification, into a second exclusive access command, the second exclusive access command including a second format not dealing with exclusive access and applying to the second bus specification that does not deal with exclusive access and being generated based on a certain bit field in the second bus specification so as to perform the exclusive access, and by converting from the second access command into the first exclusive access command, the bus control circuit comprising:
an internal circuit applying to the first bus specification;
an internal connection circuit configured to transfer signals between the bus control circuit and the internal circuit; and
an external connection circuit configured to transfer signals between the bus control circuit and an external bus, applying to the second bus specification, wherein the bus control circuit comprises:
an exclusive access command conversion circuit configured to receive the first exclusive access command, convert the first exclusive access command into the second non-exclusive access command and output the second exclusive access command, when converting from the first exclusive access command into the second exclusive access command;
an exclusive access command generation circuit configured to receive the second exclusive access command and generate the first exclusive access command, when converting from the second exclusive access command into the first exclusive access command;
an exclusive access response issuing circuit configured to issue exclusive access response information for the second access command, when converting from the second exclusive access command into the first exclusive access command; and
an exclusive access response receiving circuit configured to receive exclusive access response information for the second exclusive access command, when converting from the first exclusive access command into the second exclusive access command.

9. The semiconductor integrated circuit according to claim 8, wherein
when converting from the first exclusive access command to the second exclusive access command,
the exclusive access response receiving circuit is configured to issue exclusive access command response information for the second exclusive access command to the exclusive access command conversion circuit, and
the exclusive access command conversion circuit is configured to generate an exclusive access response for the first exclusive access command based on the exclusive access command response information for the second exclusive access command.

10. The semiconductor integrated circuit according to claim 9, wherein when converting from the first exclusive access command to the second exclusive access command,
the exclusive access command conversion circuit is configured to receive an access response for a normal access command, and generate an exclusive access response for the first exclusive access command, based on the access response for the normal access command and the exclusive access command response information for the second exclusive access command.

11. The semiconductor integrated circuit according to claim 8, wherein
when converting from the second exclusive access command to the first exclusive access command,
the exclusive access command generation circuit is configured to receive an exclusive access response for the first exclusive access command, and issue an exclusive access response information for the first exclusive access command to the exclusive access response issuing circuit, based on the exclusive access response for the first exclusive access command, and
the exclusive access response issuing circuit is configured to generate exclusive access response information for the second exclusive access command, based on the exclusive access response information for the first exclusive access command.

12. The semiconductor integrated circuit according to claim 11, wherein
when converting from the second exclusive access command to the first exclusive access command,
the exclusive command generation circuit is generate an access response to a normal access command, in addition to the exclusive access response information for the first exclusive access command, based on the exclusive access response for the first exclusive access command.

13. A circuit board comprising:
the semiconductor integrated circuit according to claim 8, and a memory connected to at least the semiconductor integrated circuit, and shared by the semiconductor integrated circuit and a circuit different from the semiconductor integrated circuit.

14. An information processing device including a plurality of the circuit boards according to claim 13, wherein
each of the circuit boards is connected by a second bus applying to the second bus specification.

15. A bus control method for transferring access commands for performing exclusive access between a first bus specification and a second bus specification by converting from a first exclusive access command, the first exclusive access command including a first format applying to the first bus specification which deals with exclusive access and being an access command previously provided, based on the first bus specification, into, a second exclusive access command, the second exclusive access command including a second format applying to the second bus specification that does not deal with exclusive access and being generated based on a certain bit field in the second bus specification so as to perform the exclusive access, and by converting from the second exclusive access command into the first exclusive access command, the bus control method comprising:
receiving the first exclusive access command, converting the first exclusive access command, into the second exclusive access command, and outputting the second exclusive access command, when converting from the first exclusive access command into the second exclusive access command;

receiving exclusive access response information for the second access command, when converting from the first exclusive access command into the second exclusive access command;

receiving the second exclusive access command and generating the first exclusive access command, when converting from the second exclusive access command to into the first exclusive access command; and issuing exclusive access response information in response to the second exclusive access command, when converting from the second exclusive access command into the first exclusive access command.

* * * * *

UNITED STATES PATENT AND TRADEMARK OFFICE
CERTIFICATE OF CORRECTION

PATENT NO.       : 10,747,699 B2
APPLICATION NO.  : 16/273943
DATED            : August 18, 2020
INVENTOR(S)      : Takayuki Otani et al.

Page 1 of 1

It is certified that error appears in the above-identified patent and that said Letters Patent is hereby corrected as shown below:

On the Title Page

Please insert item (30):
-- (30) Foreign Application Priority Data
Aug. 31, 2016   (JP) ............................ 2016-169971 --

Signed and Sealed this
Twelfth Day of January, 2021

Andrei Iancu
*Director of the United States Patent and Trademark Office*